(12) United States Patent (10) Patent No.: US 8,948,448 B2
Iwasaki et al. (45) Date of Patent: Feb. 3, 2015

(54) METHOD AND APPARATUS FOR TRAJECTORY ESTIMATION, AND METHOD FOR SEGMENTATION

(75) Inventors: Masahiro Iwasaki, Kyoto (JP); Kunio Nobori, Osaka (JP); Ayako Komoto, Osaka (JP); Fabio Galasso, Cambridge (GB); Roberto Cipolla, Cambridge (GB)

(73) Assignee: Panasonic Corporation, Osaka (JP)

( * ) Notice: Subject to any disclaimer, the term of this patent is extended or adjusted under 35 U.S.C. 154(b) by 173 days.

(21) Appl. No.: 13/336,330

(22) Filed: Dec. 23, 2011

(65) Prior Publication Data

US 2012/0106794 A1 May 3, 2012

Related U.S. Application Data

(63) Continuation of application No. PCT/EP2010/001612, filed on Mar. 15, 2010.

(51) Int. Cl.
*G06K 9/00* (2006.01)
*G06T 7/20* (2006.01)

(52) U.S. Cl.
CPC .................. *G06T 7/2006* (2013.01)
USPC .......................... 382/103; 382/104

(58) Field of Classification Search
CPC ...... G06K 9/00; G06K 9/0021; G06T 1/0007; H04N 2013/0074
USPC ......... 382/100, 103–104, 106–107, 118, 154, 382/173–174, 195, 236, 245, 248; 348/143, 348/413, 416, 118, 172, 401–412; 378/65; 375/240.16, 240.24; 707/101, 104.1
See application file for complete search history.

(56) References Cited

U.S. PATENT DOCUMENTS 5,594,504 A 1/1997 Ebrahimi
5,608,458 A 3/1997 Chen et al.
(Continued)

FOREIGN PATENT DOCUMENTS

EP 0 691 789 1/1996
EP 0 707 427 4/1996
(Continued)

OTHER PUBLICATIONS

International Search Report issued Dec. 14, 2010 in International (PCT) Application No. PCT/EP2010/001612.
(Continued)

*Primary Examiner* — Hadi Akhavannik
*Assistant Examiner* — Mehdi Rashidian
(74) *Attorney, Agent, or Firm* — Wenderoth, Lind & Ponack, L.L.P.

(57) ABSTRACT

A trajectory estimation apparatus includes: an image acceptance unit which accepts images that are temporally sequential and included in the video; a hierarchical subregion generating unit which generates subregions at hierarchical levels by performing hierarchical segmentation on each of the images accepted by the image acceptance unit such that, among subregions belonging to hierarchical levels different from each other, a spatially larger subregion includes spatially smaller subregions; and a representative trajectory estimation unit which estimates, as a representative trajectory, a trajectory, in the video, of a subregion included in a certain image, by searching for a subregion that is most similar to the subregion included in the certain image, across hierarchical levels in an image different from the certain image.

13 Claims, 27 Drawing Sheets

(56) References Cited

U.S. PATENT DOCUMENTS

| | | | |
|---|---|---|---|
| 6,130,964 A * | 10/2000 | Marques et al. | 382/236 |
| 8,213,681 B2 * | 7/2012 | Nobori et al. | 382/103 |
| 2002/0114394 A1 * | 8/2002 | Ma | 375/240.16 |
| 2004/0013305 A1 * | 1/2004 | Brandt et al. | 382/224 |
| 2006/0088191 A1 * | 4/2006 | Zhang et al. | 382/107 |
| 2006/0222205 A1 * | 10/2006 | Porikli et al. | 382/103 |
| 2007/0071285 A1 * | 3/2007 | Kontsevich | 382/103 |
| 2007/0185946 A1 * | 8/2007 | Basri et al. | 708/200 |
| 2009/0067677 A1 * | 3/2009 | Nobori et al. | 382/107 |
| 2011/0002509 A1 * | 1/2011 | Nobori et al. | 382/103 |

FOREIGN PATENT DOCUMENTS

| | | |
|---|---|---|
| JP | 8-214318 | 8/1996 |
| JP | 2000-513897 | 10/2000 |
| WO | 2005/081178 | 9/2005 |
| WO | 2009/112790 | 9/2009 |

OTHER PUBLICATIONS

Patent Cooperation Treaty (PCT) Written Opinion of the International Searching Authority issued Dec. 14, 2010 in International (PCT) Application No. PCT/EP2010/001612.

P. Anandan, "*A Computational Framework and an Algorithm for the Measurement of Visual Motion*", International Journal of Computer Vision, vol. 2, pp. 283-310, 1989.

Jianbo Shi et al., "*Good Features to Track*", IEEE Conference on Computer Vision and Pattern Recognition, Jun. 1994.

Vladimir Kolmogorov et al., "*Computing Visual Correspondence with Occlusions via Graph Cuts*", International Conference on Computer Vision, 2001.

Thomas Pock et al., "*A Duality Based Algorithm for TV-$L^1$-Optical-Flow Image Registration*", International Conference on Medical Image Computing and Computer Assisted Intervention, 2007.

Pablo Arbelaez et al., "*From Contours to Regions: An Empirical Evaluation*", Computer Vision and Pattern Recognition, 2009.

John R. Deller et al., "*Discrete-Time Processing of Speech Signals*", pp. 624-633, IEEE Press, 1993.

E.W. Dijkstra, "*A note on two problems in connexion with graphs*", Numerische Mathematik, pp. 269-271, 1959.

Thomas H. Cormen et al., "*Introduction to Algorithms*", MIT Press, 2001.

Zhipeng Wang et al., "*Hierarchical Detection of Moving Targets on Moving Platforms*", Intelligent Vehicles Symposium, 2009, IEEE, Piscataway, NJ, USA, Jun. 3, 2009, pp. 209-214.

Office Action with Search Report issued Jun. 26, 2014 in corresponding Chinese Application No. 201080028724.7, with English language translation of Search Report.

* cited by examiner

FIG. 24
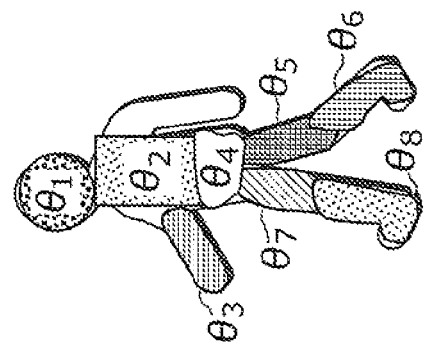
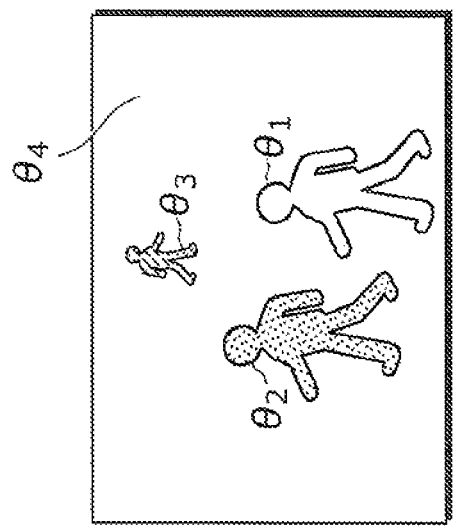

METHOD AND APPARATUS FOR TRAJECTORY ESTIMATION, AND METHOD FOR SEGMENTATION

CROSS REFERENCE TO RELATED APPLICATION

This is a continuation application of PCT application No. PCT/EP2010/001612 filed on Mar. 15, 2010, designating the United States of America.

BACKGROUND OF THE INVENTION (1) Field of the Invention

The present invention relates to a trajectory estimation method and a trajectory estimation apparatus, and a segmentation method, and particularly relates to a trajectory estimation method and a trajectory estimation apparatus, and a segmentation method which can accurately estimate, based on two or more images, trajectories of an object such as a person that moves changing shape on an image.

(2) Description of the Related Art

Conventionally, research and development for estimating trajectories on the image has been widely conducted. Particularly, the technique of estimating the trajectories of an object that changes shape such as a person is a basic technology commonly used for, for example, focus control and image quality improvement processing in a digital video camera or a digital still camera, and a driving safety support system for an automobile, or a collision avoidance control or warning using a robot.

The most common method for estimating trajectories is to estimate a motion vector based on similarity in pixel information, by providing, in an image, a block that is a partial region, and performing, on another image, a spatial search using the pixel information (pixel value) included in the block. The trajectories can be estimated by temporally concatenating such motion vectors.

However, according to this method, the motion vector is estimated based on the similarly in pixel value within the block. Thus, in the case of an image including a region such as a uniform region having no texture or a region having a striped pattern, it is not possible to accurately estimate the motion vector, thus resulting in an error to be included in the trajectories.

On the other hand, Non Patent Reference 2 describes a method for estimating more accurate trajectories. With this method, in the case of estimating the trajectories of a region such as a uniform region having no texture, the search is performed using only a robust point at which the pixel value is less likely to temporally change, such as a corner or an edge. This gives an advantage of allowing more accurate estimation of trajectories.

[Non Patent Reference 1] P. Anandan, "A computational Framework and an Algorithm for the Measurement of Visual Motion", International Journal of Computer Vision, Vol. 2, pp. 283-310, 1989

[Non Patent Reference 2] Jianbo Shi and Carlo Tomasi "Good Features to Track", IEEE Conference on Computer Vision and Pattern Recognition, pp. 593-600, 1994

SUMMARY OF THE INVENTION

However, in the conventional method, in order to handle a scale change or a shape change that frequently occurs in an object such as a person, it is necessary to assume a movement model corresponding to the scale change or the shape change. Thus, there is a problem of being unable to obtain an accurate trajectory if no appropriate setting of the movement model is performed. Particularly, it is difficult to set an appropriate movement model for the shape change without using any previous knowledge regarding the object.

Thus, the present invention is conceived to solve the above problem, and it is an object of the present invention to provide a trajectory estimation method and a trajectory estimation apparatus, and a segmentation method which can accurately estimate, based on two or more images, a trajectory, on an image, of an object such as a person that moves changing shape or an object including a uniform texture.

In order to achieve the object described above, a trajectory estimation method according to an aspect of the present invention is a trajectory estimation method for estimating a trajectory of a subregion constituting all or part of a moving object in video, and the trajectory estimation method includes: accepting images included in the video, the images being temporally sequential; generating subregions at hierarchical levels by performing hierarchical segmentation on each of the images accepted in the accepting such that a spatially larger subregion includes spatially smaller subregions, the spatially larger subregion and the spatially smaller subregions belonging to hierarchical levels different from each other; and estimating, as a representative trajectory, a trajectory, in the video, of a subregion included in a certain image, by searching for a subregion that is most similar to the subregion included in the certain image, across hierarchical levels in an image different from the certain image.

Note that the present invention can be realized not only as the trajectory estimation method described above but also as: a trajectory estimation apparatus including, as constituent elements, characteristic steps included in the trajectory estimation method; a program causing a computer to execute the characteristic steps including in the trajectory estimation method; and a computer-readable nonvolatile recording medium such as a compact disc-read only memory (CD-ROM) on which the program is stored.

According to the present invention, it is possible to accurately estimate a trajectory on an image, of an object such as a person that moves changing shape or an object including a uniform texture.

FURTHER INFORMATION ABOUT TECHNICAL BACKGROUND TO THIS APPLICATION

The disclosure of PCT application No. PCT/EP2010/001612 filed on Mar. 15, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 24 is a diagram showing an example of the result of the processing performed by the segmentation unit according to the second embodiment of the present invention;

DESCRIPTION OF THE PREFERRED EMBODIMENTS

Figure 1:
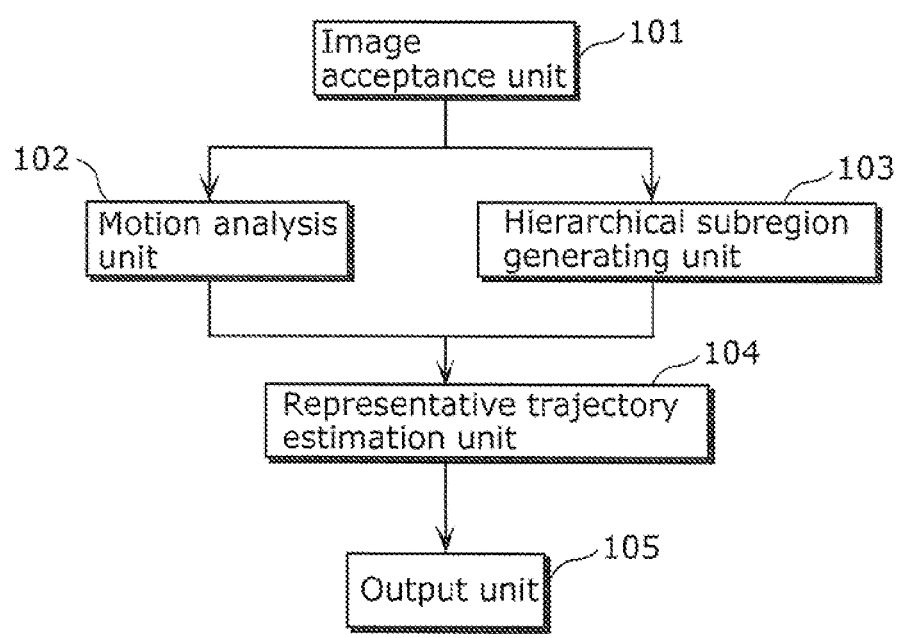
FIG. 1 is a functional block diagram showing a basic configuration of a trajectory estimation apparatus according to a first embodiment of the present invention.

An embodiment of the present invention is a trajectory estimation method for estimating a trajectory of a subregion constituting all or part of a moving object in video, and the trajectory estimation method includes: accepting images included in the video, the images being temporally sequential; generating subregions at hierarchical levels by performing hierarchical segmentation on each of the images accepted in the accepting such that a spatially larger subregion includes spatially smaller subregions, the spatially larger subregion and the spatially smaller subregions belonging to hierarchical levels different from each other; and estimating, as a representative trajectory, a trajectory, in the video, of a subregion included in a certain image, by searching for a subregion that is most similar to the subregion included in the certain image, across hierarchical levels in an image different from the certain image, and in the estimating, a predictive subregion which is a subregion predicted in the another image is generated by changing a shape of the subregion included in the certain image, and the representative trajectory is obtained by searching for the subregion that is the most similar to the predictive subregion, across the hierarchical levels in the another image According to this configuration, the subregion is searched across hierarchy. Since this facilitates absorbing differences in shape and size, it is possible to improve search accuracy. Particularly, it is possible to accurately estimate the trajectory of an object such as a person that moves changing shape or an object including a uniform texture.

Preferably, the trajectory estimation method described above further includes generating, in the video, a trajectory of a block by analyzing motion between the images for each block made up of one or more pixels included in each of the images, and in the estimating, the predictive subregion is generated by moving the subregion included in the certain image in accordance with the trajectory of a block included in the subregion.

According to this configuration, it is also possible to robustly estimate the trajectory in response to the shape change of the subregion by generating a template at the next time, based on the trajectory belonging to each subregion.

More preferably, in the estimating, the trajectory included in each of the subregions generated in the generating is smoothed for the each of the subregions, and the representative trajectory is estimated based on the smoothed trajectory included in the each of the subregions.

According to this configuration, it is possible to estimate, for each region, a coherent and consistent trajectory by correcting the trajectory on a per-subregion basis.

More preferably, in the estimating, the subregion is searched by determining a similarity between subregions, using a similarity measure including at least one of shape information and a pixel value for the subregion.

According to this configuration, it is possible to estimate the trajectory, based on a similarity measure including at least one of shape information and a pixel value.

In addition, in the estimating, the representative trajectory may be estimated by (i) assuming a graph in which: the subregion included in the certain image and the subregion included in the another image are nodes; one of the nodes that indicates the subregion included in the certain image and the other that indicates the subregion included in the another image are connected using an edge; and a value that is smaller for a larger similarity between the subregions connected by the edge is an edge weight, and (ii) generating an optimal path for the graph by applying dynamic programming to the graph.

According to this configuration, it is possible to accurately estimate the representative trajectory in a relatively long period of time from the viewpoint of global optimization, by assuming the graph described above and calculating the optimal path using dynamic programming. Particularly, in the case of estimating the representative trajectories for three or more frames, it is possible to estimate an optimal representative trajectory from information regarding the total frames.

Preferably, in the generating, the subregions are generated at the hierarchical levels, based on a feature including contour information.

According to this configuration, by using the feature including contour information, it is possible to generate a subregion which is robust for fluctuation in color and brightness and from which influences such as a shadow are excluded, and as a result, it is possible to estimate a highly accurate trajectory.

Another embodiment of the present invention is a segmentation method for performing segmentation on video per moving object, and the segmentation method includes: processing the video using the trajectory estimation method described above; and performing segmentation on the video by integrating subregions having similar representative trajectories.

According to this configuration, it is possible to perform segmentation using the estimated trajectories and subregions. Thus, in the case of the object changing shape, it is also possible to perform segmentation more accurately.

Preferably, in the performing, the segmentation is performed by transforming a distance between the representative trajectories into a geodetic distance by connecting distances smaller than a threshold, detecting a discontinuity point in the obtained geodetic distance, and classifying, into one class, trajectories separate from each other at a distance smaller than the geodetic distance at the detected discontinuity point.

According to this configuration, trajectories that are separate from each other at the distance smaller than the geodetic distance at the discontinuity point are classified into one class. Thus, as compared to the clustering using Euclidean distance that is a linear distance, the clustering considering a spatiotemporal continuity in the similarity between trajectories is performed. Thus, whether each block in the picture belongs to the same object (or region) or belongs to another object (or region) is reliably discriminated. As a result, even in the case of detecting an articulated object such as a person composed of regions having different motions, segmentation is correctly performed, so that the moving object is reliably detected. In other words, it is possible to accurately perform segmentation on the moving object such as a person that moves changing shape, and to thereby detect the moving object in the image.

In addition, in the performing, based on representative trajectories corresponding to subregions to be integrated and the representative trajectory of at least one subregion adjacent to the subregions to be integrated, it may be determined whether or not to integrate the subregions to be integrated.

According to this configuration, it is possible to perform segmentation considering the adjacent subregion, by considering not only the subregions to be integrated but also the adjacent subregion. Thus, this produces an advantageous effect of being able to better reflect the structure of the image and perform segmentation that is less susceptible to influences such as difference in size of the object in as the image.

Preferably, in the performing, the segmentation is performed based on a connection relationship indicated in a minimum spanning tree which is calculated according to a graph in which: the representative trajectories are assumed as nodes and are connected with each other using an edge; and the distance between representative trajectories connected by the edge is assumed as an edge weight.

It is possible to perform segmentation with a smaller amount of calculation by representing the representative trajectory in a limited connection relationship using a minimum spanning tree.

More preferably, in the performing, the segmentation is performed by determining, in the minimum spanning tree, whether or not to integrate a pair of representative trajectories having a relationship in which the representative trajectories are directly connected to each other using one edge, based on edge weights connecting the pair with at least one representative trajectory adjacent to the pair.

According to this configuration, it is possible to consider a relationship between regions including a relationship between a hand and a foot, by performing such pairwise clustering including neighborhood. Thus, this gives an advantage of allowing accurate segmentation even on an articulated object such as a person. In addition, since a relationship with a spatially distant place is also considered, it is possible to perform segmentation that is less susceptible to influences such as a change or difference in size of the object in the image.

Yet another embodiment of the present invention is a trajectory estimation apparatus for estimating a trajectory of a subregion constituting all or part of a moving object in video, and the trajectory estimation apparatus includes: an image acceptance unit which accepts images included in the video, the images being temporally sequential; a hierarchical subregion generating unit which generates subregions at hierarchical levels by performing hierarchical segmentation on each of the images accepted by the image acceptance unit such that a spatially larger subregion includes spatially smaller subregions, the spatially larger subregion and the spatially smaller subregions belonging to hierarchical levels different from each other; and a representative trajectory estimation unit which estimates, as a representative trajectory, a trajectory, in the video, of a subregion included in a certain image, by searching for a subregion that is most similar to the subregion included in the certain image, across hierarchical levels in an image different from the certain image.

Yet another embodiment of the present invention is a program for estimating a trajectory of a subregion constituting all or part of a moving object in video, and the program causes a computer to execute: accepting images included in the video, the images being temporally sequential; generating subregions at hierarchical levels by performing hierarchical segmentation on each of the images accepted in the accepting such that a spatially larger subregion includes spatially smaller subregions, the spatially larger subregion and the spatially smaller subregions belonging to hierarchical levels different from each other; and estimating, as a representative trajectory, a trajectory, in the video, of a subregion included in a certain image, by searching for a subregion that is most similar to the subregion included in the certain image, across hierarchical levels in an image different from the certain image.

Yet another embodiment of the present invention is a segmentation apparatus which performs segmentation on video per moving object, and the segmentation apparatus includes: the trajectory estimation apparatus described above; and a segmentation unit 1101 which performs the segmentation on the video by integrating subregions having a similarity between representative trajectories.

Yet another embodiment of the present invention is a program for performing segmentation on video per moving object, and the program causes a computer to execute: processing included in the trajectory estimation method described above; and performing the segmentation on the video by integrating subregions having a similarity between representative trajectories.

Hereinafter, embodiments of the present invention are described with reference to the drawings.

First Embodiment

FIG. 1 is a diagram showing a configuration of a trajectory estimation apparatus according to a first embodiment. The trajectory estimation apparatus shown in FIG. 1 is an apparatus that accurately estimates trajectories of an object such as a person that moves changing shape or an object including a uniform texture, and includes an image acceptance unit 101, a motion analysis unit 102, a hierarchical subregion generating unit 103, a representative trajectory estimation unit 104, and an output unit 105. Note that essential constituent elements in the present invention are the image acceptance unit 101, the hierarchical subregion generating unit 103, and the representative trajectory estimation unit 104, and the trajectory estimation apparatus need not include the motion analysis unit 102 and the output unit 105.

The image acceptance unit 101 accepts an input of images which are temporally sequential and included in video. The image acceptance unit 101, for example, is a video camera or a communication interface and so on connected to the video camera.

The motion analysis unit 102 generates, in the video, a trajectory of a block by analyzing motion between images for each block made up of one or more pixels included the each of the images accepted by the image acceptance unit 101. In other words, the motion analysis unit 102 estimates block motion using at least two temporally different images from among the images accepted by the image acceptance unit 101. The motion analysis unit 102 estimates the trajectory of a pixel by tracking the movement of the block on the images that are temporally sequential, based on the estimated block motion.

The hierarchical subregion generating unit 103 generates subregions at hierarchical levels by performing hierarchical segmentation on each of the images accepted by the image acceptance unit 101 such that, among subregions belonging to hierarchical levels different from each other, a spatially larger subregion includes spatially smaller subregions. The hierarchical subregion generating unit 103 performs segmentation into subregions, on the images obtained by the image acceptance unit 101, using, particularly, a feature including contour information. The hierarchical subregion generating unit 103 hierarchically performs segmentation, from a spatially coarse subregion to a fine subregion. The present embodiment has a feature that a spatially coarse subregion (in a spatially larger size) includes a spatially fine subregion (in a spatially smaller size).

The representative trajectory estimation unit 104 estimates, as a representative trajectory, a trajectory, in the video, of a subregion included in a certain image, by searching for a subregion that is most similar to the subregion included in the certain image, across hierarchical levels in an image different from the certain image. With this processing, the representative trajectory estimation unit 104 estimates a trajectory which represents each subregion. More specifically, the representative trajectory estimation unit 104 generates a predictive subregion which is a subregion that can be predicted in the image different from the certain image by moving the subregion included in the certain image along with the trajectory of the block included in the subregion, and estimates, as the representative trajectory, the trajectory, in the video, of the subregion included in the certain image, by searching for the subregion that is most similar to the predictive subregion, across hierarchical levels in the image different from the certain image. Here produced is an advantageous effect of being able to handle the shape change of the subregion by generating the predictive subregion (template) using the trajectory for each subregion. Furthermore, the spatial search performed across hierarchy produces an advantageous effect of being able to accurately calculate the trajectory in a region having a uniform texture and so on. Note that the representative trajectory estimation unit 104 searches for the subregion by determining a similarity between subregions, using a similarity measure including at least one of shape information and pixel values of the subregion.

The output unit 105 outputs the trajectory representing each subregion to a monitor (display) or the like. According to the present embodiment, it is also possible to output a result as a result of a spatiotemporal segmentation, based on each subregion and the trajectory thereof.

Figure 2:
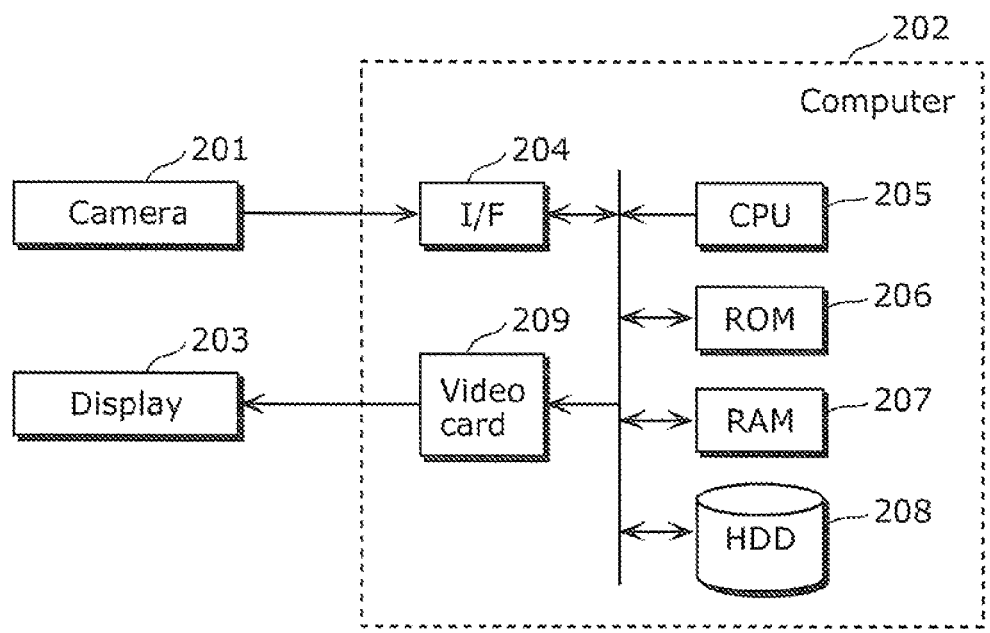
FIG. 2 is a functional block diagram showing a hardware configuration of the trajectory estimation apparatus according to the first embodiment of the present invention.

Note that each of the constituent elements included in the trajectory estimation apparatus (the image acceptance unit 101, the motion analysis unit 102, the hierarchical subregion generating unit 103, the representative trajectory estimation unit 104, and the output unit 105) may be realized using software such as a program executed on a computer which includes a CPU, a random access memory (RAM), a read only memory (ROM), a communication interface, an input/output (I/O) port, a hard disk, a display, and so on, and may also be realized as hardware such as an electronic circuit. The same holds for a segmentation apparatus in another embodiment. FIG. 2 is a diagram showing a hardware configuration of the trajectory estimation apparatus according to the present embodiment, which is to be realized using software. In FIG. 2, a camera 201 captures and outputs an image, and a computer 202 obtains the image captured by the camera 201, performs processing for estimating the representative trajectory, and generates an image for displaying the result of the calculation of the representative trajectory. A display 203 obtains and displays the image generated by the computer 202. The computer 202 includes: an interface (I/F) 204, a CPU 205, a ROM 206, a RAM 207, a hard disk drive (HDD) 208, and a video card 209. A program causing the computer 202 to operate is previously held by the ROM 206 or the HDD 208. The program is read out from the ROM 206 or HDD 208 by the CPU 205 that is a processor, and is expanded by the RAM 207. The CPU 205 executes each coded command in the program expanded by the RAM 207. Intermediate processed data for executing the program is temporarily stored on the RAM 207 or the HDD 208. The I/F 204 retrieves the image captured by the camera 201 into the RAM 207, according to the execution of the program. The video card 209 outputs the image generated according to the execution of the program, and the display 203 displays the output image.

Note that the computer program may be stored on, for example, an optical disk or the like that is a nonvolatile recording medium, not limited to the ROM 206 that is a semiconductor or the HDD 208. In addition, the computer program may also be transmitted via a wired or wireless network, broadcasting, and so on, and may be retrieved into the RAM 207 in the computer.

Hereinafter, the operation of the representative trajectory estimation apparatus according to the first embodiment of the present invention is described using a flowchart in FIG. 3. Here described is an example of accepting an input of images including an object such as a person that moves changing shape or an object including a uniform texture, and then estimating a trajectory.

The image acceptance unit 101 accepts an input of T images (T≥2) (Step S301).

The motion analysis unit 102 estimates information on a motion between the inputted T images, and generates and outputs a trajectory (Step S302). Here, the method for estimating the motion between the T images is to search for a corresponding pixel included in the other T−1 image with reference to a point I on a certain image among the T images.

Figure 4:
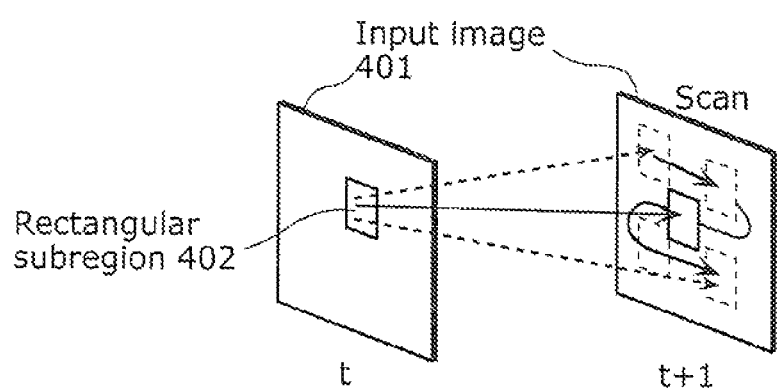
FIG. 4 is a diagram showing an example of processing for estimating motion vector according to the first embodiment of the present invention.

Note that the method for estimating the motion between images may refer to I rectangular subregions (blocks) instead of the pixel at point I. For example, as shown in FIG. 4, pixel coordinates $(x_{t+1}^i, y_{t+1}^i)$ on an image at time t+1, which correspond to pixel coordinates $(x_t^i, y_t^i)$ (i=1 ... I) of the pixel i on an image at time t, are estimated using input images 401 captured at time t and time t+1. At this time, a rectangular subregion 402 (block) at time t is scanned on the image at time t+1 (dashed arrow), and pixel coordinates (solid arrow) having a smallest summation of differences between the pixel value in the rectangular subregion at time t and the pixel value in the rectangular subregion at time t+1 are estimated as the corresponding pixel. For the pixel coordinates, pixel coordinates indicating a center position of the block may be used. Here, a scan range may be previously determined. In addition, for calculating the differences, anything may be used as long as it represents the differences in pixel value in the blocks to be compared: a mean squared error between the pixel value in the rectangular subregion at time t and the pixel value in the rectangular subregion at time t+1 may be used, and a measure less susceptible to an influence of an outlier, such as a median, may also be used. In the case of three or more images, the point corresponding to the point I in each of the inputted I images is estimated by sequentially estimating corresponding coordinates.

As another specific method for estimating the corresponding point between images as described above, the method disclosed in Non Patent References 1, 3, 4, and so on may also be used. Regarding the specific method for estimating the corresponding point between images, since these Non Patent References are incorporated herein for reference, the detailed description thereof is not repeated here.

[Non Patent Reference 3] Vladimir Kolmogorov and Ramin Zabih, "Computing Visual Correspondence with Occlusions via Graph Cuts", International Conference on Computer Vision, 2001

[Non Patent Reference 4] Thomas Pock, Martin Urschler, Christopher Zach, Reinhard Beichel and Horst Bischof, "A Duality Based Algorithm for TV-L1-Optimal-Flow Image Registration", International Conference on Medical Image Computing and Computer Assisted Intervention, 2007

In Step S302, when assuming, for example, that the T images are inputted in Step S301, the motion analysis unit 102 estimates a motion vector $(u_t^i, v_t^i)$ of the pixel i, using the two images captured at time t and time t+1. Here, the two images need not be temporally sequential, and the pixel motion may also be estimated using, for example, images inputted at time t and time t+n. However, n is an integer equal to or larger than 1.

Note that the motion analysis unit 102 may estimate and use an affine parameter as motion information instead of using the motion vector. At this time, the motion analysis unit 102 may estimate motion information for all pixels. In addition, when it is intended to perform high-speed processing, the motion analysis unit 102 may section the image into grids and estimate motion information on only the pixels on the grids at predetermined intervals, or as described earlier, may section the image into blocks and estimate motion information on a per-block basis. Furthermore, when estimating the motion vector using the method disclosed in Non Patent Reference 1, the motion analysis unit 102 can estimate reliability of the motion information, and thus may estimate only highly reliable motion information and use the estimated information as motion information. In addition, when estimating the motion vector using the method disclosed in Non Patent Reference 3, the motion analysis unit 102 can estimate occlusion. Thus, the motion analysis unit 102 may estimate only information on a pixel that is not occluded and use the estimated information as motion information.

Furthermore, as a method for estimating the pixel motion, the motion analysis unit 102 may use a method of estimating a motion vector by assuming an affine transformation of the block, instead of using the method of estimating the motion vector by assuming parallel movement of the block as described earlier. For the method of estimating the motion vector by assuming the affine transformation, it is possible to use the method disclosed in Non Patent Reference 2. The method disclosed in Non Patent Reference 2 is to estimate an affine parameter $A_t^i$ corresponding to the motion of the neighborhood of the pixel i in the images inputted at time t and time t+1. For the pixel i, pixel positions $x_t^i$ and $x_{t+1}^i$ on the images at time t and time t+1 have the following relationship (Expression 1).

$$x_{t+1}^i = A_t^i x_t^i \qquad \text{(Expression 1)}$$

According to this method, it is possible to estimate, particularly for a moving object that is rotationally moving, the motion of the pixel i more accurately than in the case of using the method of estimating the motion vector by assuming parallel movement.

Figure 3:
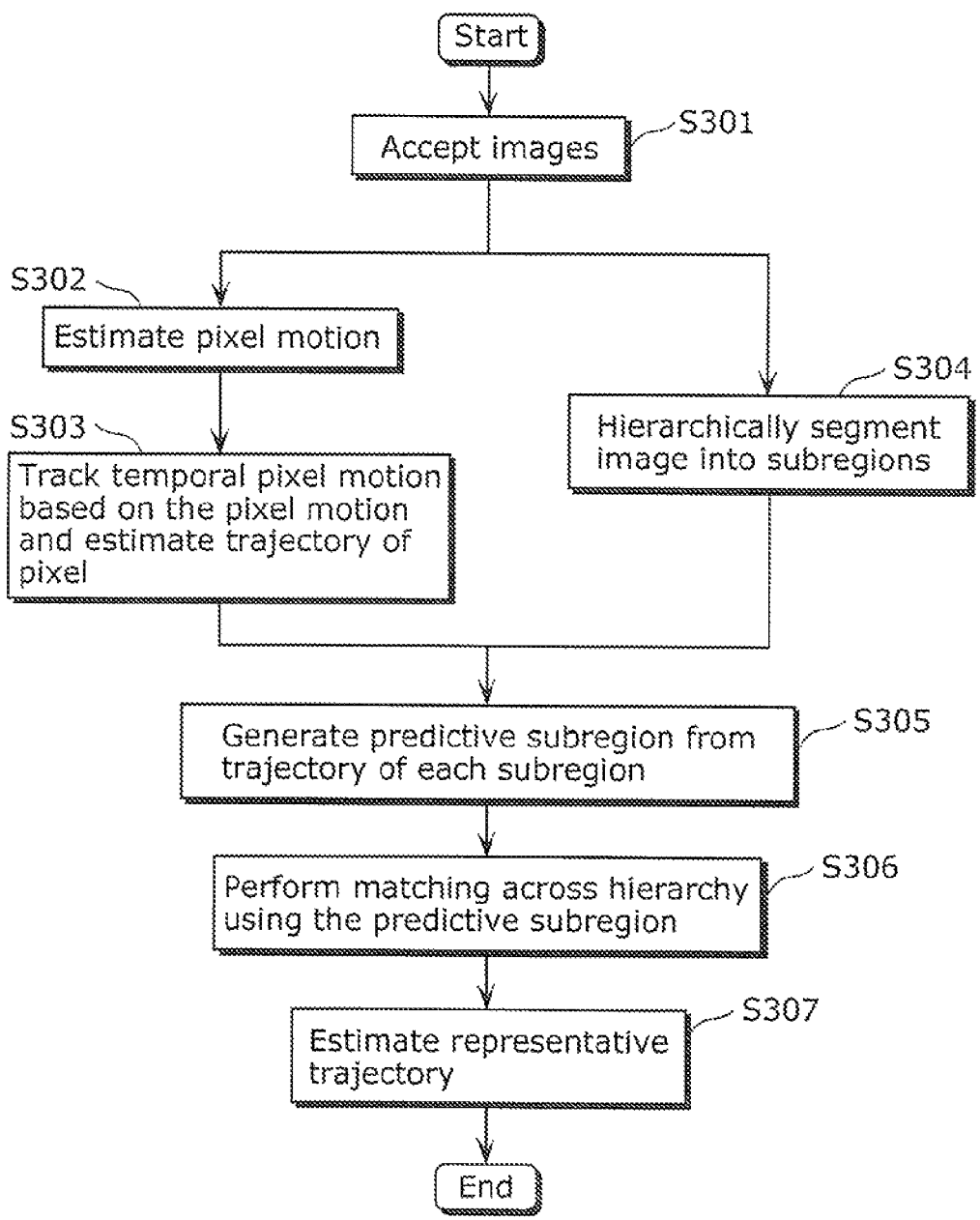
FIG. 3 is a flowchart showing a basic operation of the trajectory estimation apparatus according to the first embodiment of the present invention.
Figure 5:
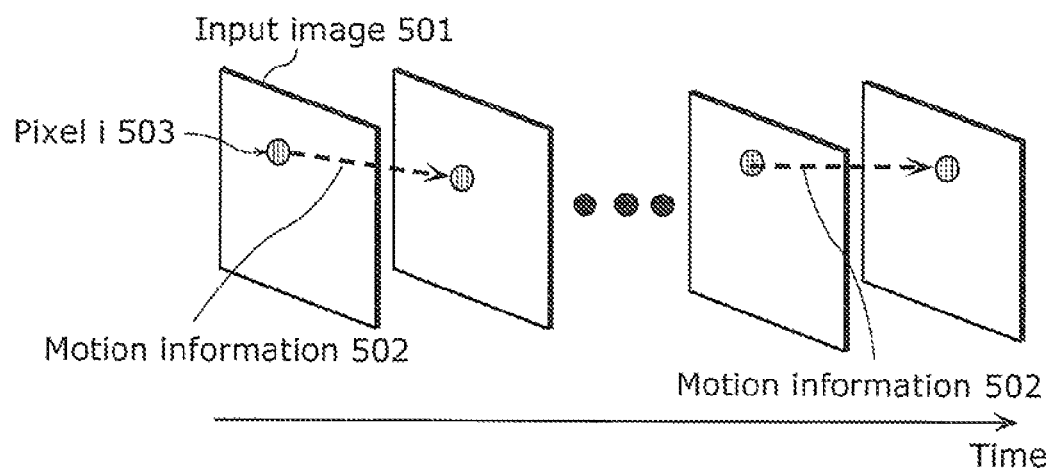
FIG. 5 is a diagram showing an example of processing for estimating trajectories according to the first embodiment of the present invention.

Again, with reference to FIG. 3, the motion analysis unit 102 estimates, for the temporally serial T pictures, the trajectory of the pixel i based on the motion of the pixel i, using the motion information estimated in Step S302 (Step S303). As shown in FIG. 5, the motion of the pixel i is tracked starting from a pixel i 503 of an input image 501 inputted at time t, using motion information 502 estimated in Step S302. At this time, by using the pixel position $(x_t^i, y_t^i)$ on the image at time t through which the pixel i has passed, the trajectory of the pixel i is estimated as follows. In other words, (Expression 2) represents the trajectory of the pixel position $(x_t^i, y_t^i)$ from a first image to the Tth image.

$$x^i = (x_1^i, y_1^i, \ldots, x_t^i, y_t^i, \ldots, x_T^i, y_T^i) \quad \text{(Expression 2)}$$

Here, T is the number of images used for the calculation of the trajectory.

Again, with reference to FIG. 3, the hierarchical subregion generating unit 103 hierarchically segments, into subregions, the respective images obtained by the image acceptance unit 101 by performing a plurality of segmentations each performed using a different spatial partition number (granularity) (Step S304). Each hierarchical level corresponds to the granularity of subregion segmentation, and a spatial largeness (size) of each subregion is relatively large at a hierarchical level having a coarse granularity, and the spatial largeness (size) of the subregion is relatively small at a hierarchical level having a fine granularity.

Figure 6:
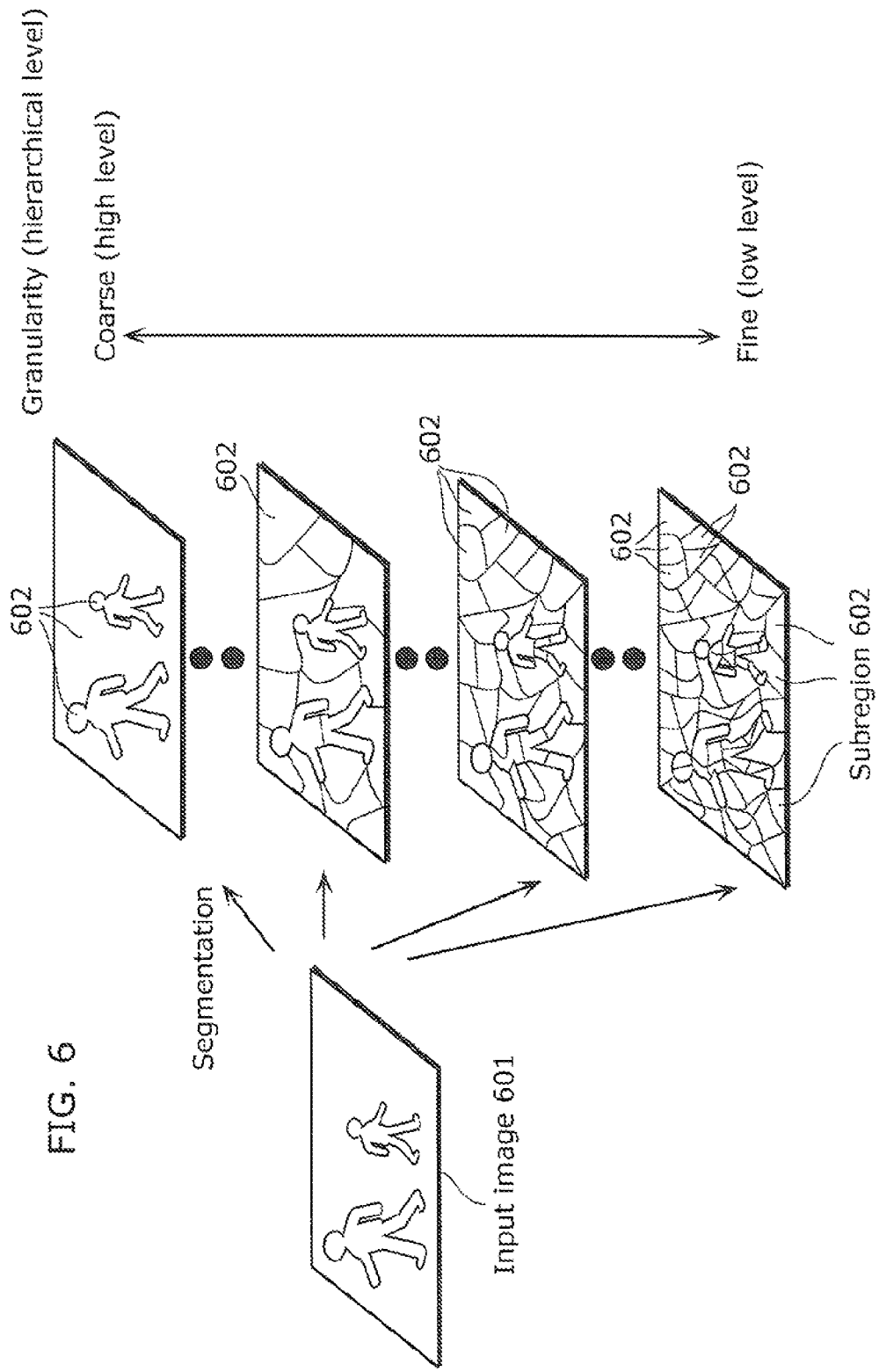
FIG. 6 is a diagram showing an example of processing performed by a hierarchical subregion generating unit according to the first embodiment of the present invention.

FIG. 6 shows an example of the result of hierarchically segmenting one input image 601 into subregions 602. As shown in FIG. 6, in Step S304, the hierarchical subregion generating unit 103 segments the input image 601 into the subregions 602 so as to establish a relationship in which a subregion 602 at a higher hierarchical level (having a coarse granularity) includes a subregion 602 at a lower hierarchical level (having a fine granularity). Note that reversely, a relationship in which a subregion at a lower hierarchical level includes a subregion at a higher hierarchical level may also be established.

The number of hierarchical levels may be previously determined, and may also be determined starting from an upper limit to the number of subregions. It goes without saying that the number of hierarchical levels may vary according to the time. In the first embodiment, it is assumed that the number of hierarchical levels is previously determined.

Figure 7:
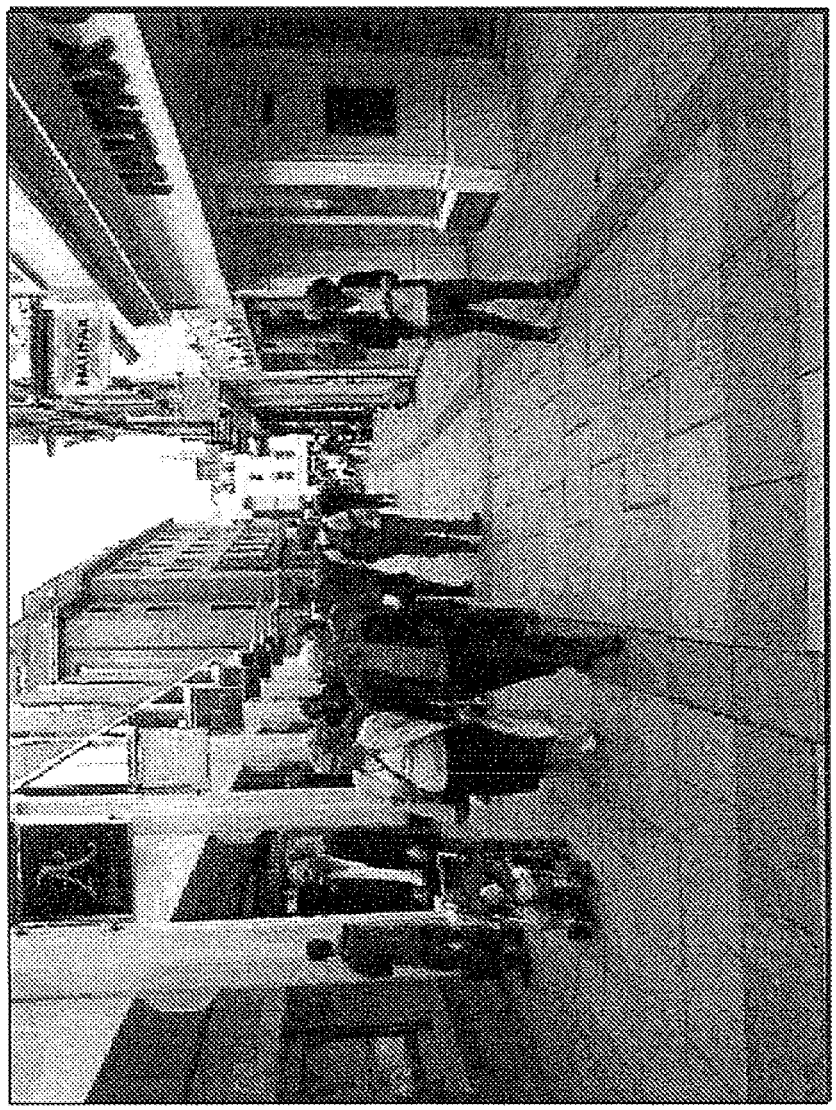
FIG. 7 is a diagram showing an example of an input image inputted by the hierarchical subregion generating unit according to the first embodiment of the present invention.
Figure 8:
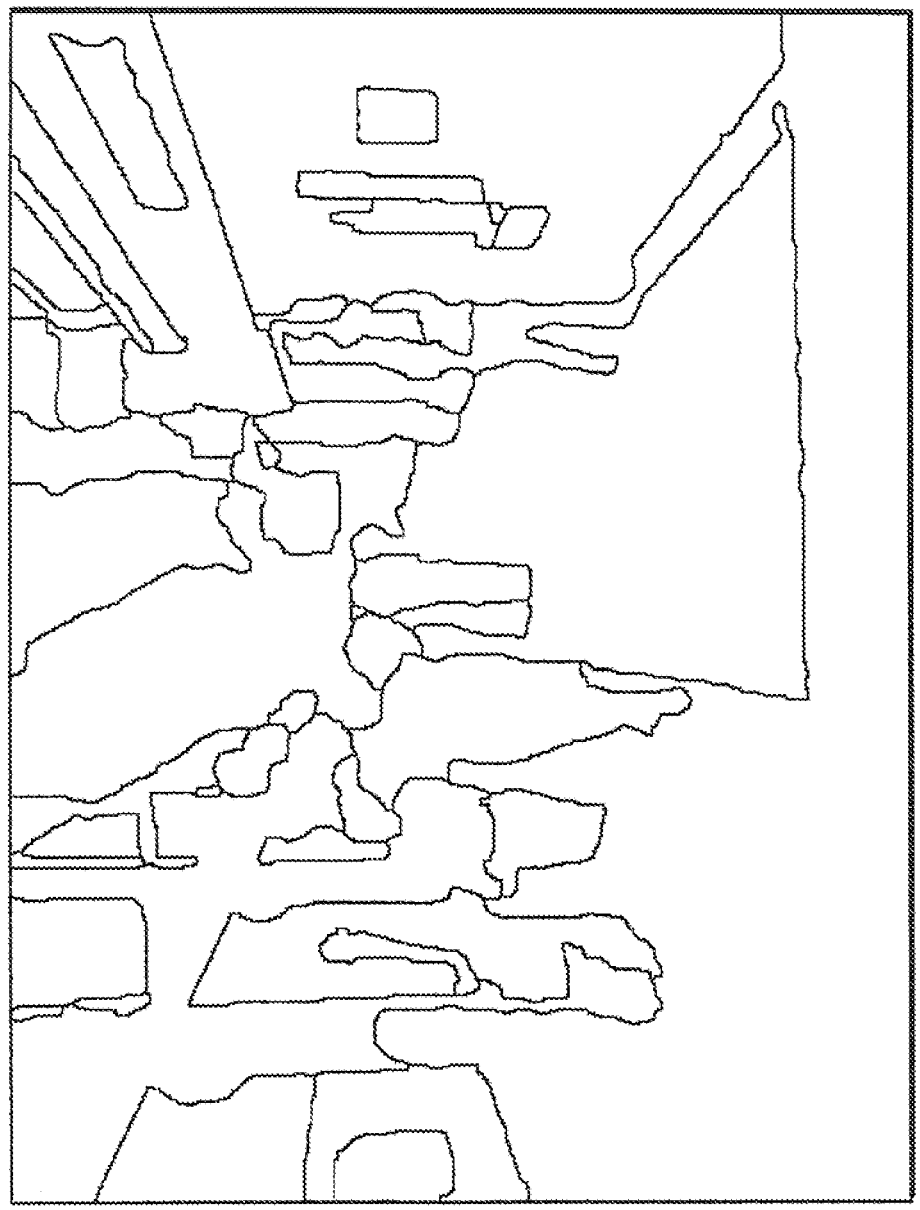
FIG. 8 is a diagram showing an example of a result of the processing performed by the hierarchical subregion generating unit according to the first embodiment of the present invention.
Figure 9:
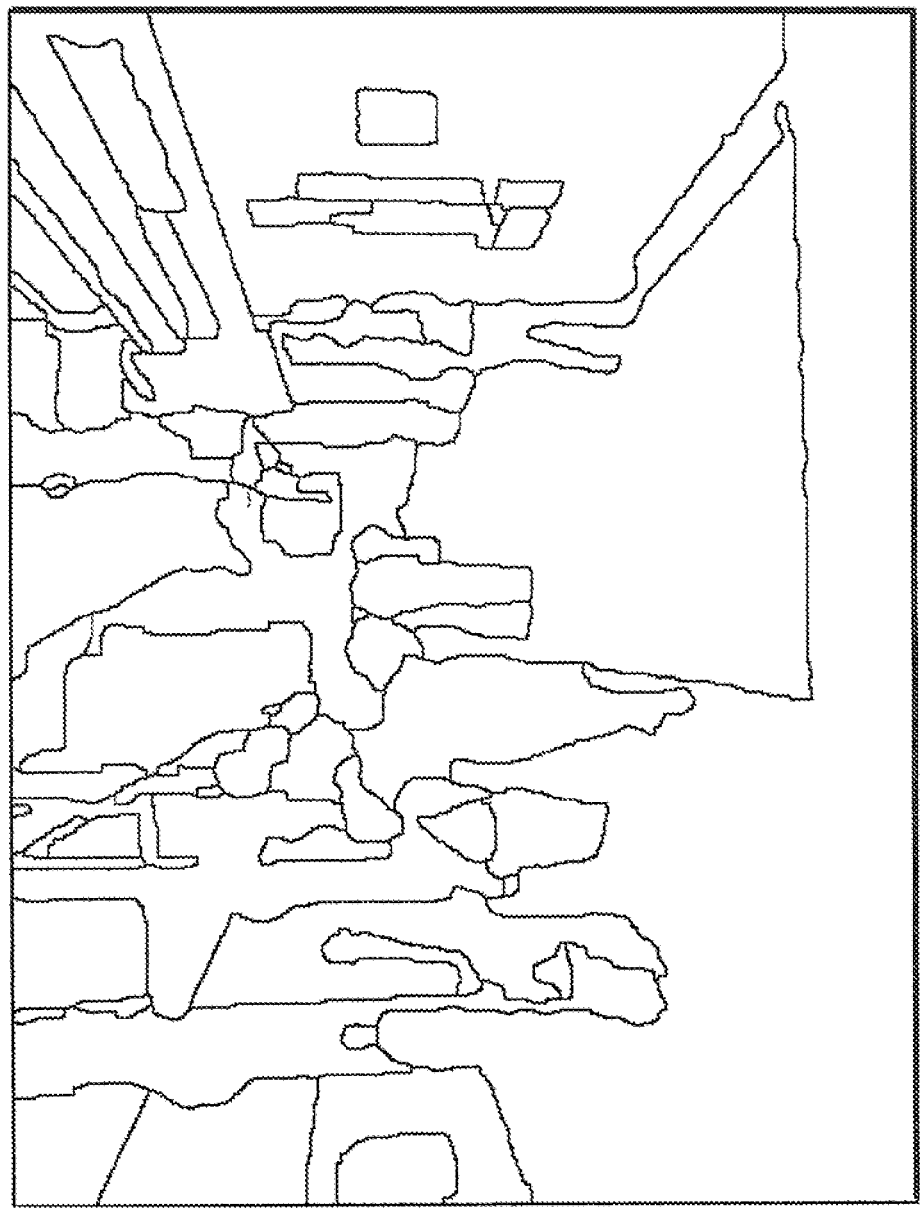
FIG. 9 is a diagram showing an example of the result of the processing performed by the hierarchical subregion generating unit according to the first embodiment of the present invention.
Figure 10:
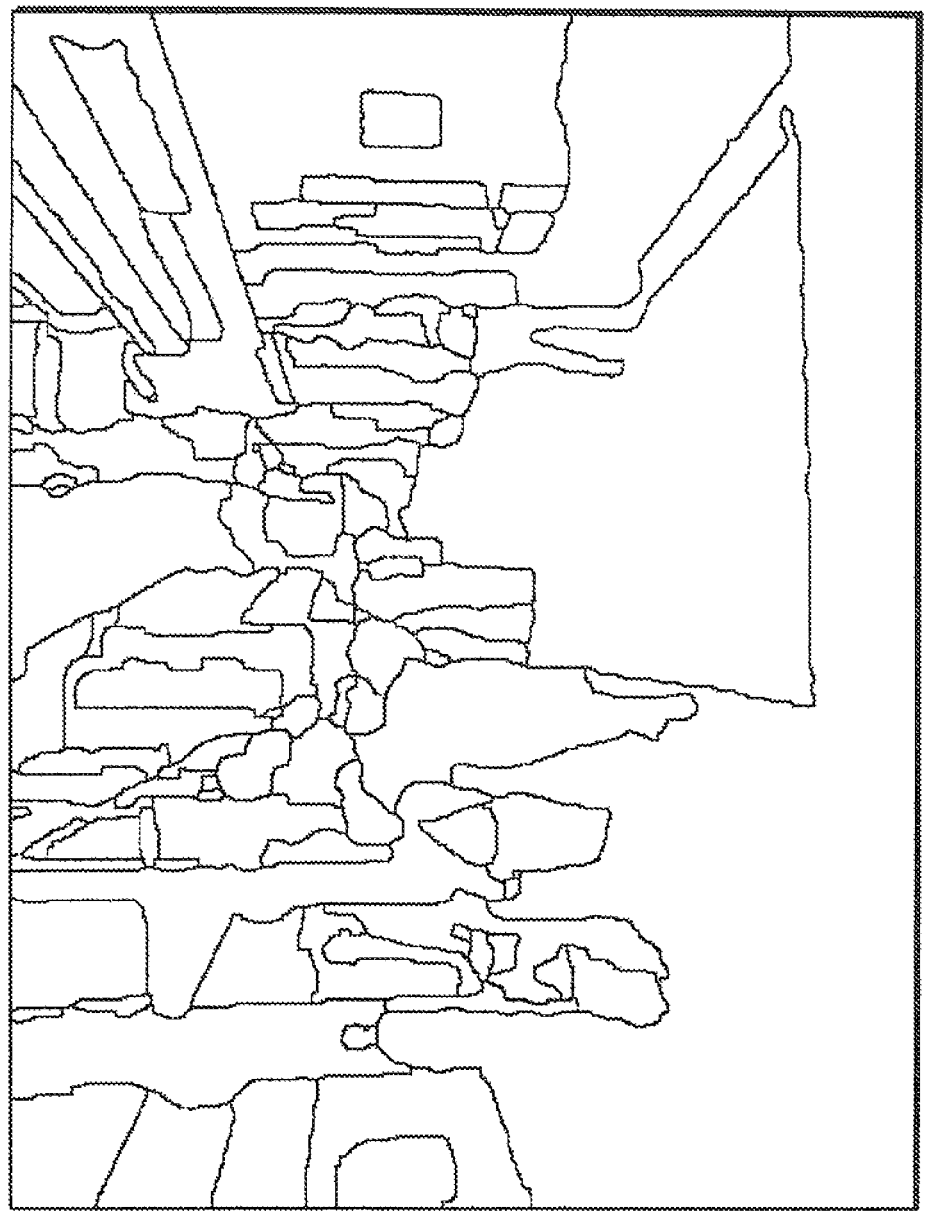
FIG. 10 is a diagram showing an example of the result of the processing performed by the hierarchical subregion generating unit according to the first embodiment of the present invention.
Figure 11:
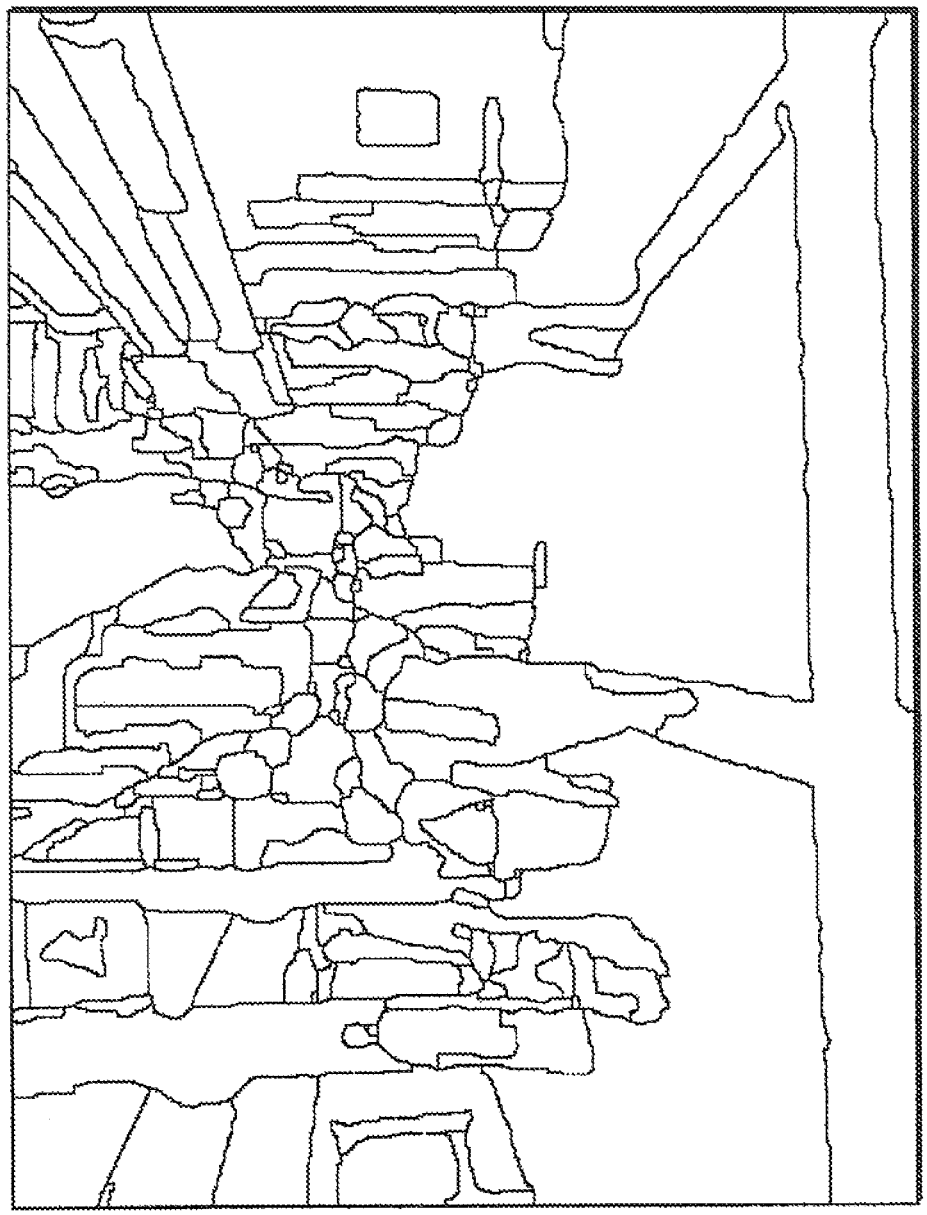
FIG. 11 is a diagram showing an example of the result of the processing performed by the hierarchical subregion generating unit according to the first embodiment of the present invention.
Figure 12:
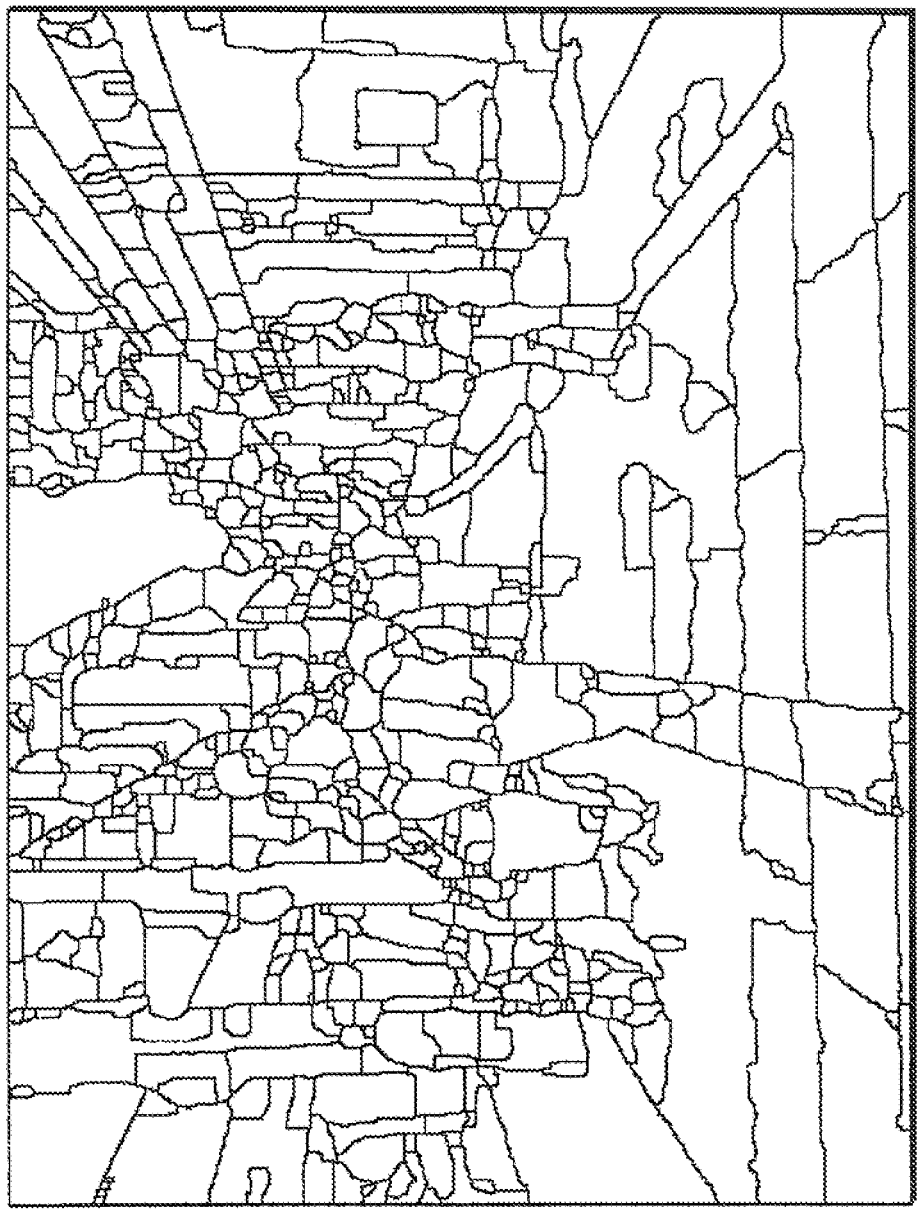
FIG. 12 is a diagram showing an example of the result of the processing performed by the hierarchical subregion generating unit according to the first embodiment of the present invention.
Figure 13:
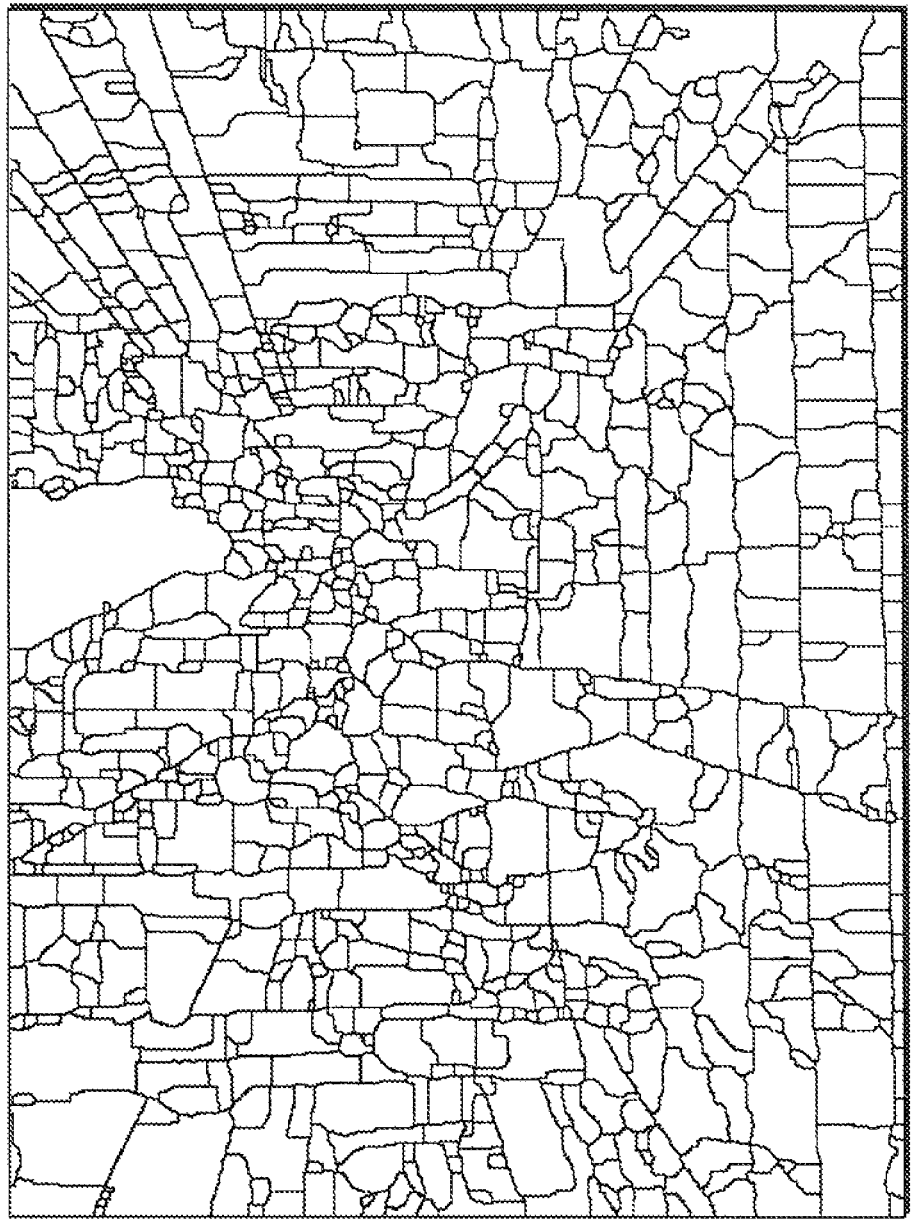
FIG. 13 is a diagram showing an example of the result of the processing performed by the hierarchical subregion generating unit according to the first embodiment of the present invention.

FIG. 7 shows an example of an actual input image, and FIGS. 8 to 13 show the result of the segmentation in order of coarse granularity. In other words, FIG. 8 shows a segmentation result having the coarsest granularity (at the highest hierarchical level), and FIG. 13 shows a segmentation result having the finest granularity (at the lowest hierarchical level). As shown by these segmentation results, a subregion at a higher hierarchical level includes a subregion at a lower hierarchical level.

Since the above-described method for hierarchically segmenting an image into subregions is a widely known method as disclosed in Non Patent Reference 5, for example, the detailed description thereof is not repeated here. With the method disclosed in Non Patent Reference 5, such subregion segmentation, performed using a feature including contour information, produces an advantageous effect of allowing segmentation which is less influenced by fluctuations in color and brightness and thus allowing a stable segmentation into subregions. In the present embodiment, the subregion segmentation may also be performed using the feature including contour information.

[Non Patent Reference 5] Pablo Arbelaez, Michael Maire, Charless Fowlkes and Jitendra Marik, "From Contours to Regions: An Empirical Evaluation", Computer Vision and Pattern Recognition, 2009

Again, with reference to FIG. 3, the representative trajectory estimation unit 104 generates a predictive subregion at a time for a destination to which the subregion has moved, using the subregion and the trajectories belonging to the subregion, so as to adapt to the temporal shape change of the subregion (Step S305). Here, for the predictive subregion, a pixel value that is included in the subregion and located at a time for a source from which the subregion has moved. Note that the predictive subregion is used for matching processing (Step S306) which is to be described later, but the matching may be performed using shape information of the predictive subregion or may be performed using pixel value information.

Here, an example where the predictive subregion is generated as a template is described. Here, it is preferable that the template be generated from a predetermined hierarchical level, or a hierarchical level including a predetermined number of subregions. First, among subregions resulting from the segmentation performed by the hierarchical subregion generating unit 103 and the trajectories estimated by the motion analysis unit 102, a trajectory passing through each of the subregions is represented as below. The trajectory passing though a subregion is a trajectory of a pixel included in the subregion.

$$x^{sc\_i} = (x_1^{sc\_i}, y_1^{sc\_i}, \ldots, x_t^{sc\_i}, y_t^{sc\_i}, \ldots, x_T^{sc\_i}, y_T^{sc\_i}) sc\_i \varepsilon \text{subregion } sc \quad \text{(Expression 3)}$$

Here, sc_i represents a trajectory i belonging to a subregion sc.

Figure 14:
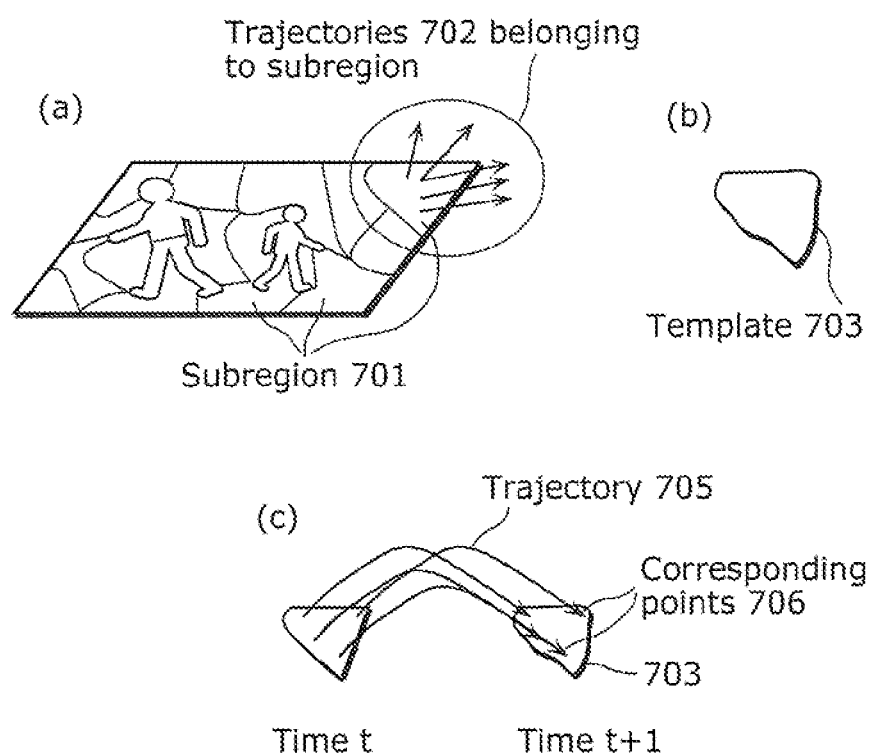
FIG. 14 is a diagram showing an example of the processing for generating a template by a representative trajectory estimation unit according to the first embodiment of the present invention.

The method for generating the template in Step S305 is described using FIG. 14. As shown in FIG. 14(a) and FIG. 14(b), first, the representative trajectory estimation unit 104 calculates a shape of a template 703 at a time different from a time for a subregion 701, from the information on the destination of trajectories 702 belonging to the subregion 701. Here, the method for generating the template for the subregion 701 at the next time is described, but the template need not be generated at the next time but may be generated at whatever time as long as the information on the destination can be used. For example, the template at a time earlier than the time for the subregion 701 may be generated, and the following process may be performed in the same manner. More specifically, with reference to FIG. 14(c), it is assumed that the representative trajectory estimation unit 104 estimates a set of corresponding points 706 of the trajectory 705 at time t+1, from the trajectory i belonging to a subregion sc at time t, and determines the set as the template 703. Note that it is assumed that for the pixel value of each pixel included in the template 703, the pixel value at the source of the trajectory 705, that is, the pixel value at time t is used. Thus, the representative trajectory estimation unit 104 updates the template 703 every frame using the information on the destination of the trajectory.

With this, the shape of the template changes with time. In other words, since the predictive subregion changes with time, there is an advantageous effect of being able to trace the object while at the same time responding to the shape change of the object. Furthermore, by utilizing trajectories with spatial density, it is also possible to generate a robust template even for a nonlinear shape change. FIG. 14 has described one subregion for the sake of explanation, but the representative trajectory estimation unit 104 generates templates for plural or all subregions.

Again, with reference to FIG. 3, by spatially searching for a similar subregion at different times across hierarchy, the representative trajectory estimation unit 104 estimates the corresponding point in the subregion (Step S306). Here, in order to describe clearly, an example of performing a search across hierarchy between two images at different times is described. Specifically, the representative trajectory estimation unit 104 searches, across hierarchy and using the predictive subregion generated in Step S305, for a subregion having a smallest error from the predictive subregion, from among subregions at time t+1 which are hierarchically generated. Hereinafter, as a specific example, described is an example of performing matching with the image segmented into subregions generated at time t+1 or the shape of the subregions, using the predictive subregion as the template.

Figure 15:
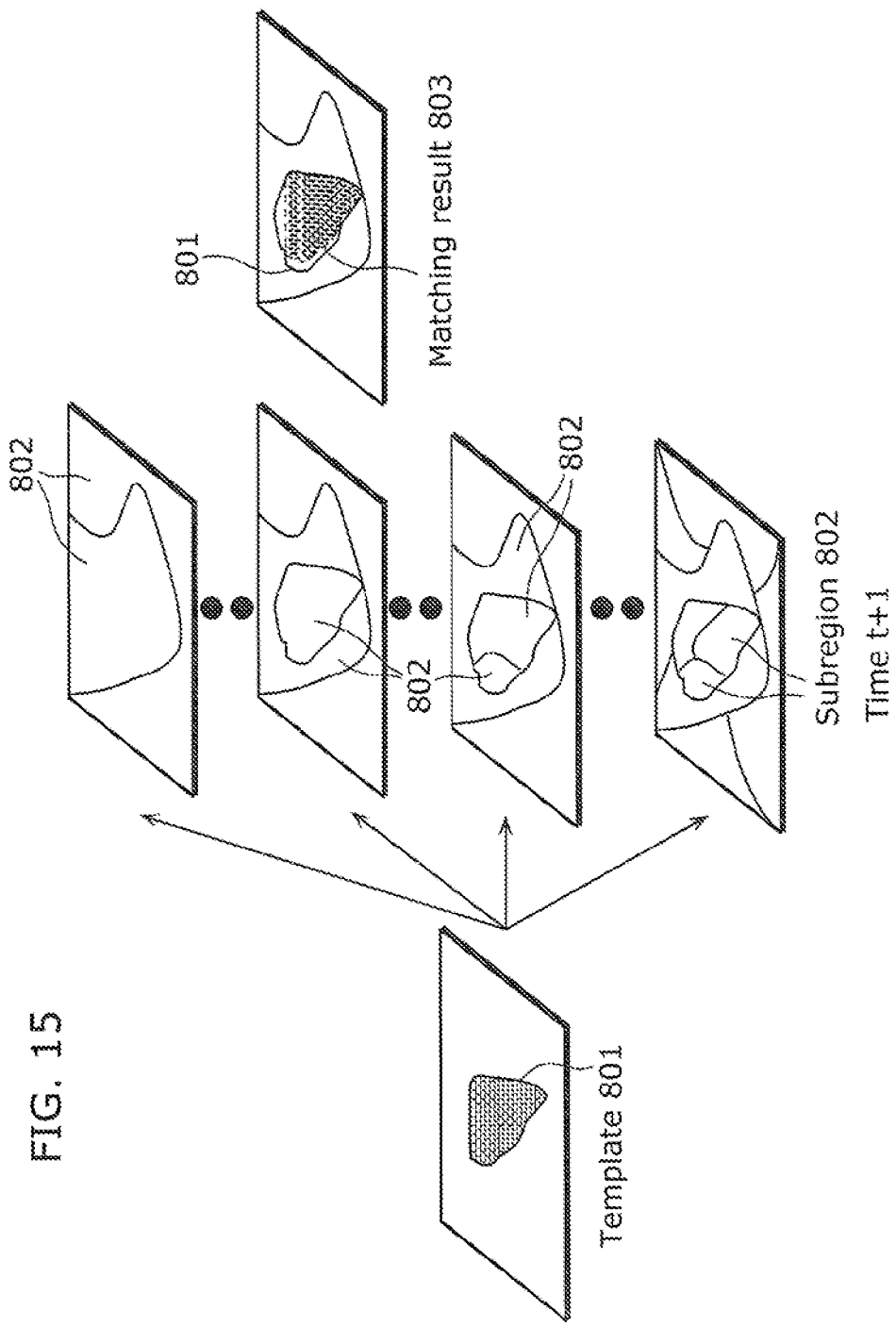
FIG. 15 is a diagram showing an example of matching processing performed by the representative trajectory estimation unit according to the first embodiment of the present invention.

With reference to FIG. 15, the representative trajectory estimation unit 104 performs matching with each of the subregions 802 at time t+1, using a template 801 generated in Step S305. Here, matching with subregions 802 at all the hierarchical levels may be performed using one template 801, or the matching may be performed only on a subregion 802 at a neighboring hierarchical level of the hierarchical level that the template 801 belongs to. The matching is performed by calculating a summation of differences between the pixel value of the template 801 and the pixel value of each of the subregions 802 at time t+1.

It is assumed that the template 801 matches best a subregion 802 having a smallest summation of differences. In other words, having the smallest summation of differences is equivalent to having a largest similarity. At this time, it is assumed that the corresponding points are the centroid position of the subregion 802 at time t that has been used for generating the template 801 and a centroid position of the template 801 that matches the subregion 802 best at time t+1. By repeating this calculation in a temporal direction, it is possible to calculate the representative trajectory from the corresponding point.

Here, the target, range of the spatial matching may be previously limited to the periphery and so on of the position of the template 801 at time t, or matching may also be performed only in a hierarchical direction without performing the spatial matching because the trajectory information has been used for generating the template 801 in step S305. For calculating the differences (similarity), anything may be used as long as it indicates a difference in pixel value between the template 801 and each of the subregions 802: a mean squared error between the pixel value of the template 801 and the pixel value of each of the subregions 802 at time t+1 may be used, and a measure less susceptible to the influence of an outlier, such as a median, may also be used. In addition, normalization may also be performed on such measures as the summation of differences in pixel value and the mean squared error, using the sum of the pixel number of the template 801 and the pixel number of a subregion 802 to be matched. For example, when assuming that the pixel number of the template 801 is Tnum, the pixel number of the subregion 802 to be matched is Rnum, and the pixel number of pixels overlapping each other and included in the template 801 and the subregion 802 to be matched is Onum, it is possible to normalize the summation of differences according to (Expression 4) below.

Normalized summation of differences=summation of differences×($T$num+$R$num)/$O$num    (Expression 4)

In addition, instead of using pixel values, the similarity between the shape of the template 801 and the shape of the subregion 802 to be matched may be used as a similarity measure. For example, it is possible to use, as similarity, a value obtained by normalizing the number of pixels overlapping when the template 801 and the subregion 802 are superimposed, using the pixel numbers of the template 801 and the subregion 802. Then, the subregion 802 having the highest similarity can be considered to match the template 801 best.

Figure 16:
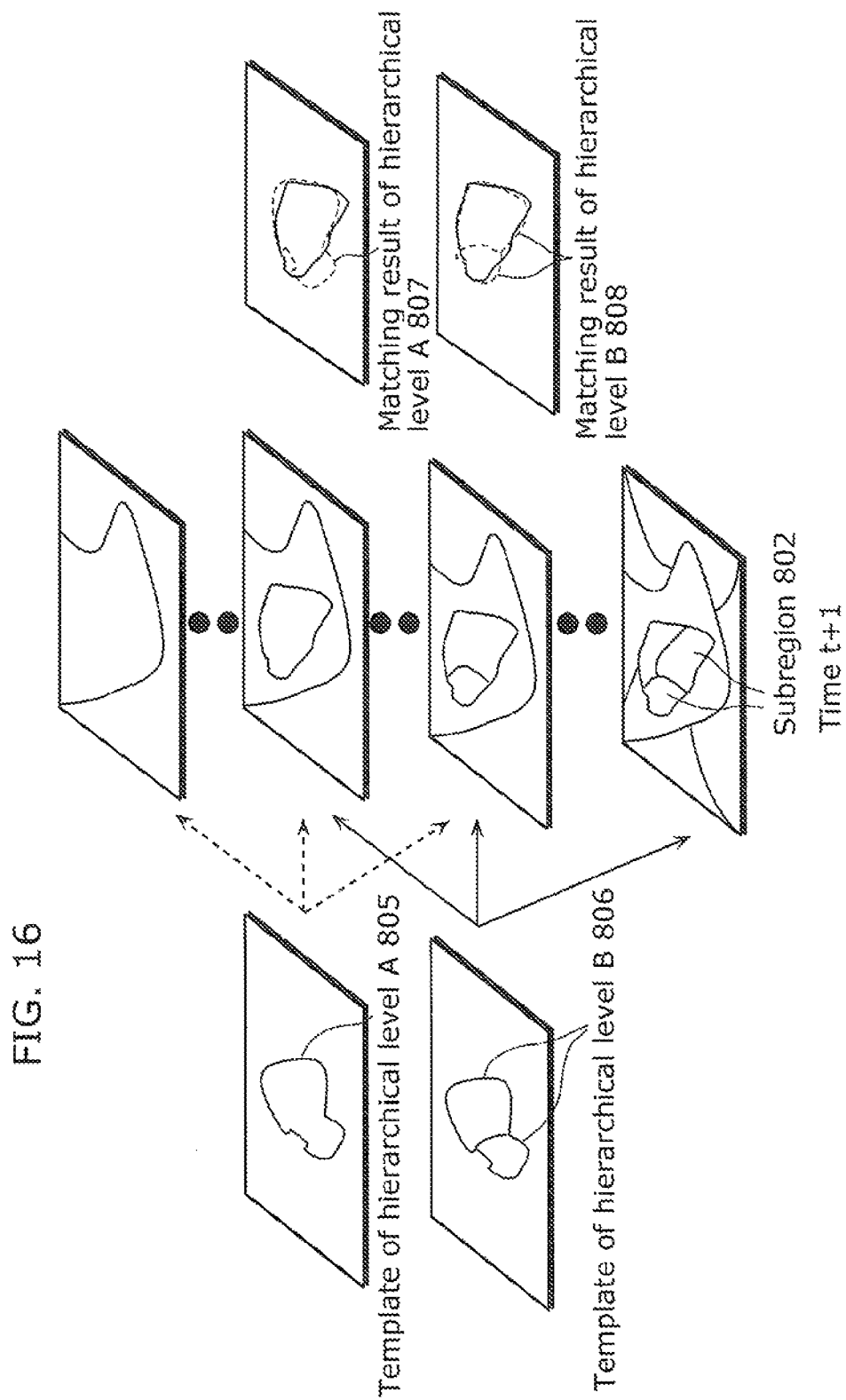
FIG. 16 is a diagram showing another example of matching processing performed by the representative trajectory estimation unit according to the first embodiment of the present invention.

Furthermore, as shown in FIG. 16, when the shape change of the subregion between the two images is large, there is a possibility of the similarity being small as shown by a matching result 807 of hierarchical level A, thus resulting in the case where proper matching cannot be performed even when using the template 805 of hierarchical level A. In this case, the following processing may be performed. The similarity becomes small when matching cannot be properly performed. Thus, when the similarity resulting from the matching using the template 805 of hierarchical level A is smaller than a predetermined value, matching is to be performed using a template for the subregions at hierarchical level B which includes finer subregions generated from segmentation than those at hierarchical level A. Here, since the input image 601 is segmented into subregions 602 in Step S304 so as to establish a relationship in which a subregion 602 of a higher hierarchical level (having a coarse granularity) includes a subregion 602 of a lower hierarchical level (having a fine granularity), it is possible to use an inclusion relationship between the template of hierarchical level A and the template of hierarchical level B. Specifically, matching is performed using each of the two templates such as the template 806 of hierarchical level B which has the inclusion relationship with the template 805 of hierarchical level A and including finer subregions generated from segmentation. As a result, as shown by a matching result 808 of hierarchical level B, it is possible to perform more accurate matching even when the subregion changes shape between the two images. At this time, an average of the representative trajectories of the two templates of hierarchical level B may be determined as the representative trajectory of the template of hierarchical level A.

As above, matching thus performed using the templates of different hierarchical levels having an inclusion relationship produces an advantageous effect of being able to calculate an accurate trajectory in the case where matching cannot be performed due to the shape change of the subregion. When using the method for the segmentation into subregions as disclosed in Non Patent Reference 5, a case occurs where the result of the segmentation into subregions differs between time t and time t+1 due to the movement of the object with time or camera motion at different times. Furthermore, there is also a case where the coarseness of the subregions 802 in the hierarchy varies depending on time. If this is the case, matching between the subregions 802 having large differences in size and shape and the template 801 is to be performed, thus causing a problem of being unable to perform an appropriate matching. In contrast, the matching across hierarchy is likely to absorb differences in shape and size as shown by the matching result 803 in FIG. 15, thus producing an advantageous effect of improving matching accuracy.

Figure 17:
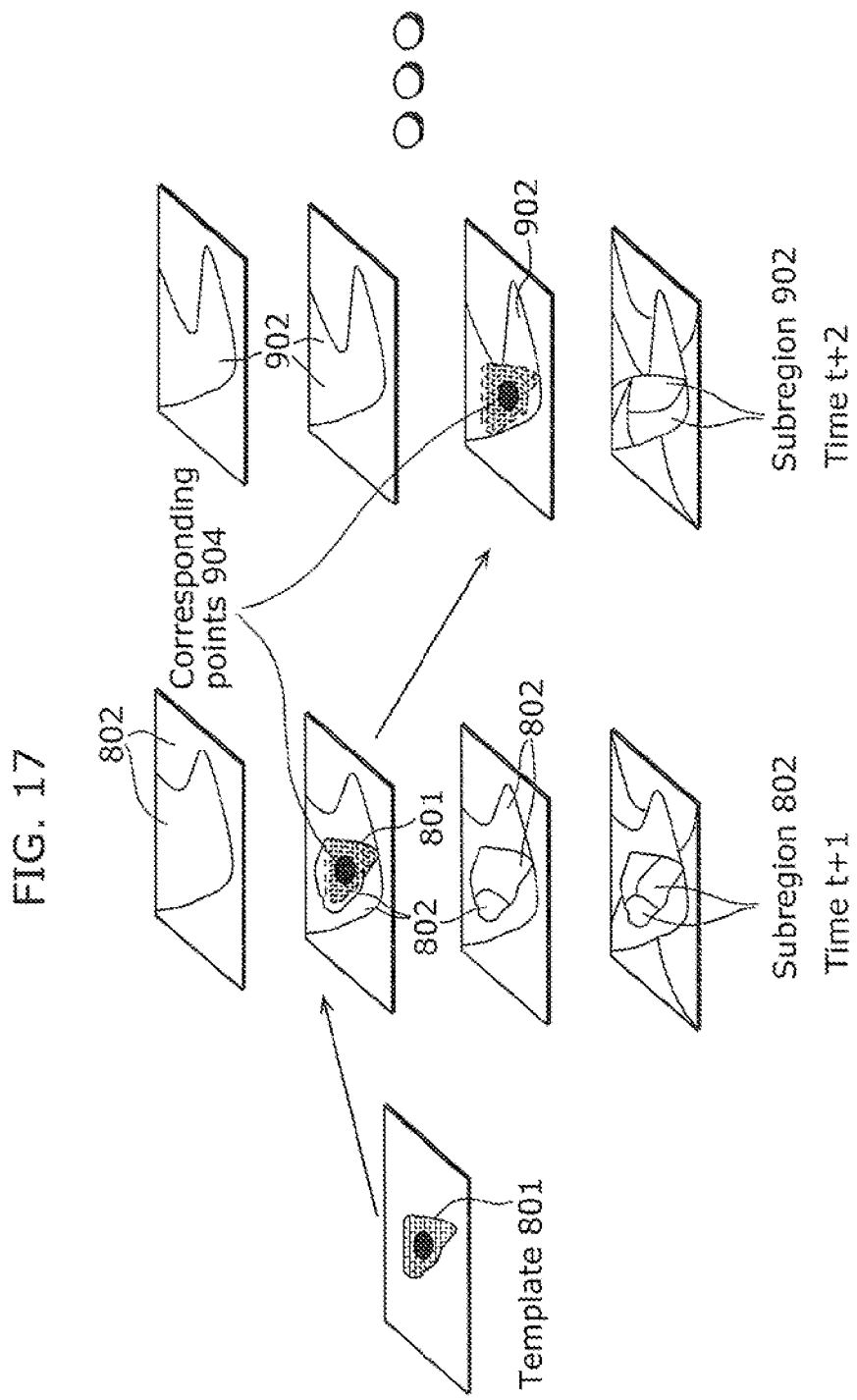
FIG. 17 is a diagram showing an example of the processing for estimating a representative trajectory by the representative trajectory estimation unit according to the first embodiment of the present invention.

Again, with reference to FIG. 3, the representative trajectory estimation unit 104 estimates the representative trajectory of each subregion 802, using the result of the matching performed in Step S306 (Step S307). As shown in FIG. 17, the representative trajectory estimation unit 104 estimates, as the representative trajectory, a trajectory of each template 801 by temporally connecting the corresponding points 904 obtained in Step S306. The representative trajectory can be represented by the following (Expression 5).

$$x^r = (x_1^r, y_1^r, \ldots, x_i^r, y_i^r, \ldots, x_T^r, y_T^r)$$    (Expression 5)

Here, $x_i^t$, $y_i^t$ is a pixel position of a corresponding point 904 in an image at time i, and the representative trajectory is made up of the corresponding points 904 that are temporally arranged.

Figure 18:
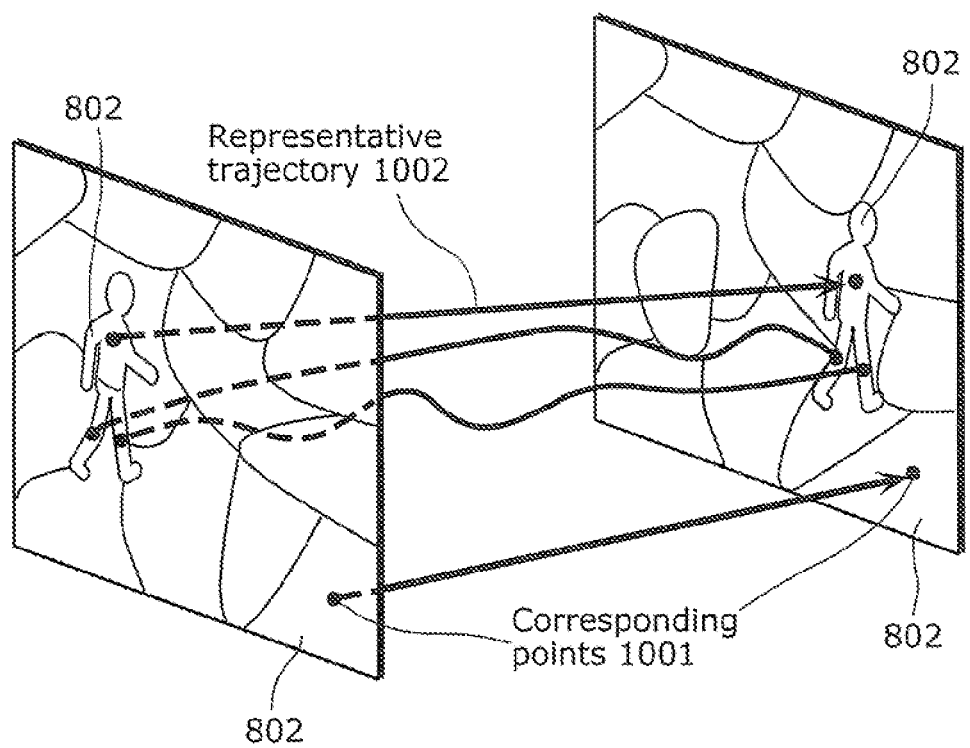
FIG. 18 is a diagram showing an example of the representative trajectory estimated by the representative trajectory estimation unit according to the first embodiment of the present invention.

As shown in FIG. 18, the trajectory estimation apparatus can obtain, for each of the subregions 802, a representative trajectory 1002 which temporally connects corresponding points 1001, by performing the processing from Steps S301 to S307 described above. Thus, the subregions 802 have spatial connectivity, and the corresponding points 1001 have temporal connectivity of the subregions 802. Thus, it is possible to concentrate spatiotemporal image information as the representative trajectory 1002. This produces an advantageous effect of being able to further reduce an amount of calculation when performing segmentation or recognizing an image. Furthermore, it is also possible to use the subregions 802 extracted here and the representative trajectory 1002 temporally connecting the subregions 802 as the result of segmentation performed on the spatiotemporal image.

As described above, in the first embodiment of the present invention, an image is hierarchically segmented into regions, and the correspondence between the subregions is established by performing matching across hierarchy. With this, such segmentation into subregions based on counter information allows each subregion to hold shape information. The matching based on the shape information produces an advantageous effect of being robust for change in pixel value caused by shadow and brightness change. On the other hand, in order to perform the matching based on shape information, it is necessary that each matching target hold shape information. That is, the target should be segmented into subregions. However, it is difficult to segment, into subregions, images having the same granularity but being temporally different. Thus, by segmenting the images into subregions with hierarchically different granularities and performing a search across hierarchy, it is possible to perform matching on the subregions included in such images different from each other.

Furthermore, this facilitates establishing a correspondence between subregions while simultaneously absorbing differences in shape and size, thus producing an advantageous effect of improving accuracy in the matching. Specifically, this produces an advantageous effect of being able to accurately establish a correspondence between subregions even for the object such as a person that moves changing shape or a person including a uniform texture. Furthermore, estimating trajectories based on the correspondence between the subregions produces another advantageous effect of being able to calculate accurate trajectories. In addition, using the representative trajectory estimated according to the method according to an implementation of the present invention also produces an advantageous effect of reducing an amount of calculation and improving accuracy in segmentation and image recognition.

Note that in the first embodiment, an example of estimating the representative trajectory by performing matching between the images inputted at time t and time t+1 has been described, but the representative trajectory may also be estimated by performing matching using images inputted at time t and time t+n. However, n is an integer equal to 1 or larger.

Note that in step S305 in the first embodiment, as represented by (Expression 3), trajectories passing through each of the subregions resulting from the segmentation by the hierarchical subregion generating unit 103 have been extracted from among trajectories estimated by the motion analysis unit 102, but this does not limit the trajectories to be used in Step S305, and the trajectories obtained using another method may also be used. For example, the trajectories may be re-corrected using the trajectory i belonging to the subregion sc. In other words, the representative trajectory estimation unit 104 smoothes, per subregion, the trajectories included in the subregion, and estimates a representative trajectory based on the subregion and the smoothed trajectories included in the subregion. Specifically, as represented by (Expression 6) below, by applying a bilateral filtering that is a type of smoothing filtering to the trajectory i included in the subregion sc represented by (Expression 3), it is possible to reduce the influence of the outlier and estimate trajectories having spatial smoothness. At this time, by not using a trajectory that does not belong to the subregion sc for performing the bilateral filtering, it is possible to calculate coherent and consistent trajectories for each subregion.

In addition, the outlier may be excluded by performing processing such as excluding a trajectory that deviates from an average value of trajectories belonging to the subregion sc at a level equal to or above a predetermined threshold, instead of performing bilateral filtering.

$$\hat{x}^{sc\_i} = \frac{\sum_{x^{sc\_i} \in sc} w^{sc\_j} x^{sc\_j}}{\sum_{x^{sc\_i} \in sc} w^{sc\_j}} \quad \text{(Expression 6)}$$

Here, $\hat{x}^{sc\_i}$ is a trajectory corrected by bilateral filtering. Note that w is calculated as a weighting parameter according to (Expression 7) below.

$$w^{sc\_j} = N(\sqrt{(p^{sc\_i}-p^{sc\_j})^2+(q^{sc\_i}-q^{sc\_j})^2},\sigma) \cdot N(\sqrt{(u^{sc\_i}-u^{sc\_j})^2+(u^{sc\_i}-u^{sc\_j})^2},\sigma) \cdot N(|I^{sc\_i}-I^{sc\_j}|,\sigma) \quad \text{(Expression 7)}$$

Here, N represents a Gaussian distribution, and the weight w is determined based on the differences in, from the left, the pixel position, motion vector, and pixel value, and the trajectory is corrected according to (Expression 6).

Thus, calculating a weighted average by using a neighboring trajectory belonging to the same subregion produces an advantageous effect of allowing reducing the influence of the outlier, so that the similarity in the neighborhood increases, and allowing obtaining a consistent trajectory. Here, the Gaussian distribution has been used as in (Expression 7), but it is not essential to use the Gaussian distribution. Furthermore, the weight may also be calculated using information regarding one of the motion vector, pixel value, and pixel position. Thus, no limitation is provided on what method to use as long as the method can reduce the influence of the outlier of the trajectory.

Note that in the first embodiment, an example has been described where: in Step S305, a predictive subregion is generated as a template by using the subregion and the trajectory belonging the subregion, and in Step S306, matching between the image segmented into subregions generated at time t+1 or the shape of the subregions is performed across hierarchy by using the generated template. However, the method is not limited to the above. That is, any other method may be used as long as it establishes a correspondence between subregions at different times across hierarchy.

Here described is an example of estimating the representative trajectory by performing the search over three or more images and generating a temporally optimal path. The representative trajectory estimation unit 104 estimates the representative trajectory by assuming a graph in which the subregion included in the certain image and the subregion included in the image different from the certain image are nodes; one of the nodes that indicates the subregion included in the certain image and the other that indicates the subregion included in the image different from the certain image are connected using an edge, and a value that is smaller for a larger similarity between the subregions connected by the edge is an edge weight, and generating an optimal path for the graph by applying dynamic programming to the graph. In other words, instead of obtaining a corresponding point in the subregion that matches the template best, it is also possible to generate a graph, in Step S306, by assuming that the subregion at time t is a node, and that the value used for the matching (for example, difference in pixel value between the template and the subregion) is the edge weight. With this graph, subregions (nodes) at different times are connected using an edge. Note that in the case of using similarity for the matching, it is desirable that the edge weight have a smaller value for a higher similarity (hereinafter, referred to as a path value), such as a reciprocal thereof. Use of the graph allows the processing to be performed while simultaneously keeping path values for candidate corresponding points, without restricting the best matching corresponding point to only one point. It is also possible to generate the representative trajectory by generating an optimal path in the graph by applying dynamic programming (DP) matching to this graph. Use of this method also allows estimating the same representative trajectory as in (Expression 5). Generating the graph using candidate corresponding points according to the path value of the template and the subregion so as to ultimately calculate the optimal path produces an advantageous effect of being able to accurately estimate the representative trajectory in a relatively long period of time from the viewpoint of global optimization. Note that the DP matching is detailed in Non Patent Reference 6. For the DP matching, since Non Patent Reference 6 is incorporated herein for reference, the detailed description thereof is not repeated here.

[Non-Patent Reference 6] John R. Deller, Jr. John H. L. Hansen and John G Proakis, "Discrete-Time Processing of Speech Signals", pp. 624-633, IEEE Press, 1993

Note that the first embodiment of the present invention has described, in Step S307, estimating one representative trajectory for in each region, but the representative trajectory to be estimated in Step S307 is not limited to this, and the representative trajectory may also be estimated using another method. For example, in the case of estimating a trajectory having spatial density, the motion vector and the trajectory estimated in Step S302 may be corrected using the corresponding point estimated in Step S306.

More specifically, it is possible to obtain a trajectory $x^{new\_i}$ by calculating a correction vector ($\Delta u$, $\Delta v$), as in (Expression 8), based on the motion vector (u1, v1) of the pixel that is closest to the centroid position (xm, ym) of the template and the corresponding point (xc, yc) estimated in Step S306, from among the motion vectors estimated in Step S302, and applying the correction vector to all the trajectories belonging to the template.

$$\Delta u = u1 - (xc - xm)$$

$$\Delta v = v1 - (yc - ym) \quad \text{(Expression 8)}$$

$$x^{new\_i} = x^{sc\_i} + \Delta u^{sc} \quad \text{(Expression 9)}$$

Here, $$\Delta u = (\Delta u, \Delta v) \quad \text{(Expression 10)}$$

As described above, using the corrected trajectory allows obtaining a trajectory having density, thus producing an advantageous effect of allowing use of the trajectory for a more detailed motion analysis of the object, and so on.

Note that in Step S306 in the first embodiment of the present invention, matching is performed across hierarchy using the predictive subregion, but it is possible to realize matching without the processing performed by the motion analysis unit 102. In this case, matching is to be performed without using the predictive subregion. In other words, the representative trajectory estimation unit 104 may perform matching across hierarchy between two images, using the subregion itself instead of the predictive subregion. At this time, in the case of using the prediction subregion, there is an advantageous effect of being able to narrow the search range based on the result of the motion analysis when performing matching of the subregions; however, in the case of not using the predictive subregion, it is sufficient to previously determine a spatial search range and perform the search within the range.

Second Embodiment

Next, as a second embodiment, an example is described where segmentation is performed using the subregions estimated in the first embodiment and the trajectories corresponding to the subregions, by further performing clustering on the trajectories. Although it is possible to perform segmentation by clustering the representative trajectories using the K-means method, here described is an example of performing more accurate segmentation even in the case of an object changing shape.

Figure 19:
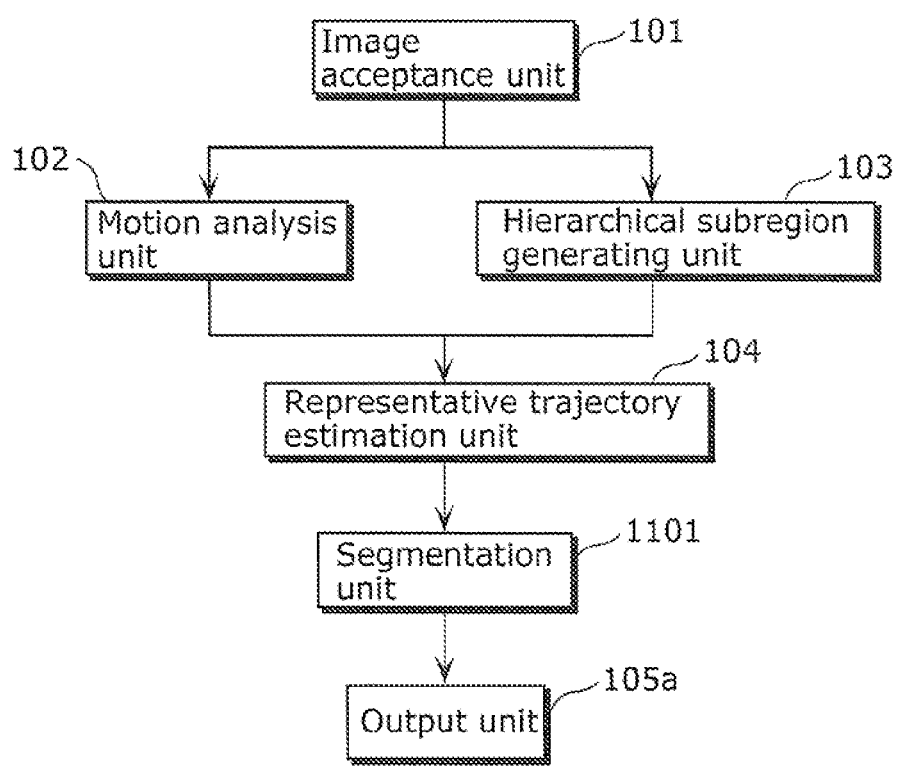
FIG. 19 is a functional block diagram showing a basic configuration of a segmentation apparatus according to a second embodiment of the present invention.

FIG. 19 is a diagram showing a configuration of a segmentation apparatus according to the second embodiment. The segmentation apparatus shown in FIG. 18 is an apparatus which performs segmentation on an image by accurately estimating a representative trajectory of an object such as a person that moves changing shape or an object including a uniform texture, and performing clustering using the estimated representative trajectory. The segmentation apparatus includes an image acceptance unit 101, a motion analysis unit 102, a hierarchical subregion generating unit 103, a representative trajectory estimation unit 104, a segmentation unit 1101, and an output unit 105a.

Since the image acceptance unit 101, the motion analysis unit 102, the hierarchical subregion generating unit 103, and the representative trajectory estimation unit 104 are the same as those in the first embodiment, the description thereof is not repeated.

The segmentation unit 1101 performs clustering on the representative trajectory by integrating subregions having similar representative trajectories, using the representative trajectories estimated by the representative trajectory estimation unit 104 and based on similarity between the representative trajectories, and performs segmentation on the image, using the subregions generated by the hierarchical subregion generating unit 103 and the clustering result. In other words, the segmentation unit 1101 performs segmentation by transforming the distance between representative trajectories into a geodetic distance by connecting distances smaller than a threshold, detects a discontinuity point in the obtained geodetic distance, and classifying, into one class, trajectories separate from each other at a distance smaller than the geodetic distance at the detected discontinuity point. The segmentation using the geodetic distance is to be described later.

The output unit 105a outputs an integrated trajectory to a monitor and so on, from the result of the clustering performed by the segmentation unit 1101, or outputs, as an image, the result of a spatiotemporal segmentation to the monitor and so on.

Figure 20:
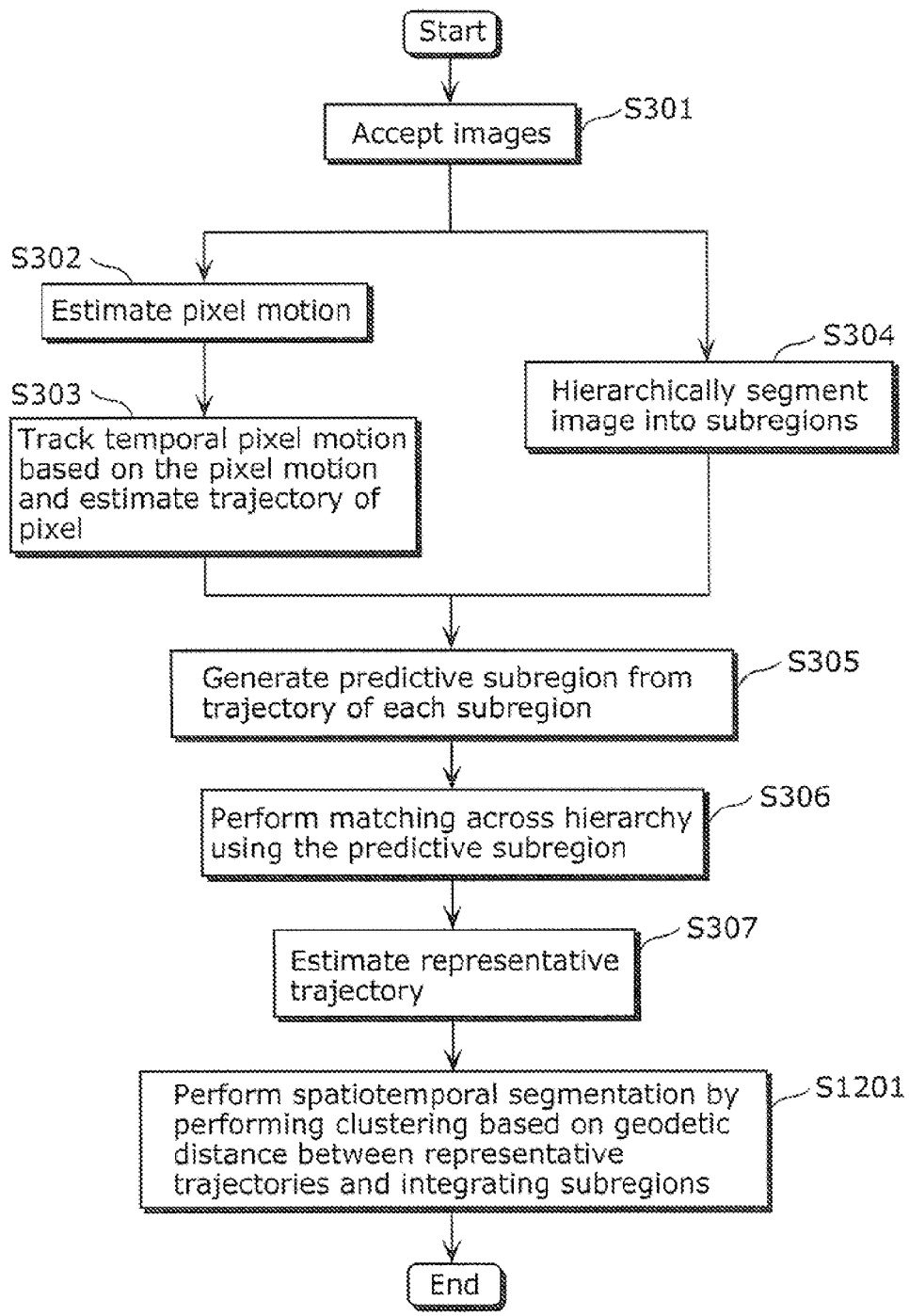
FIG. 20 is a flowchart showing a basic operation of the segmentation apparatus according to the second embodiment of the present invention.

Hereinafter, the operation of the segmentation apparatus according to the second embodiment of the present invention is described using a flowchart in FIG. 20. Here described in detail is an example of performing segmentation using the subregions estimated in the first embodiment and the trajectories corresponding to the subregions, by further performing clustering on the subregions.

Since Steps S301 to S307 are the same as those in the first embodiment, the description thereof is not repeated.

Next, the segmentation unit 1101 classifies the representative trajectories into classes by performing clustering on the representative trajectories represented by (Expression 5), (Expression 6), or (Expression 9) (Step S1201). As a result, it is possible to perform segmentation by assuming, as the same segment, a subregion that the representative trajectories classified as the same class belong to. Hereinafter, an example of performing clustering on the representative trajectories represented by (Expression 5) is described, but it is also applicable even to the case of (Expression 6) and (Expression 9) without modification.

First, the segmentation unit 1101 calculates a distance matrix representing the similarity between representative trajectories, using a representative trajectory r represented by (Expression 5). A linear distance f(r, s) between the representative trajectory r and a representative trajectory s can be calculated as (Expression 11) below.

$$f(r,s) = \text{mean}_{rs} + w \cdot \sqrt{\text{var}_{rs}} \qquad \text{(Expression 11)}$$

Here, w is a weighting factor, and is a parameter to be set by a designer. In addition, $\text{mean}_{rs}$ and $\text{var}_{rs}$ are respectively represented by (Expression 12) and (Expression 13) below.

$$\text{mean}_{rs} = \frac{1}{T}\sum_{t=1}^{T} d_{rs}^{t} \qquad \text{(Expression 12)}$$

$$\text{var}_{rs} = \frac{1}{T}\sum_{t=1}^{T} (d_{rs}^{t} - \text{mean}_{rs})^{2} \qquad \text{(Expression 13)}$$

Here, $$d_{rs}^{t} = \sqrt{(x_{t}^{r} - x_{t}^{s})^{2} + (y_{t}^{r} - y_{t}^{s})^{2}} \qquad \text{(Expression 14)}$$

As represented by (Expression 11), a temporal fluctuation component of the distance between the representative trajectories that is represented by (Expression 13) is an element of the linear distance f(r, s), in addition to a temporal mean value between the representative trajectories represented by (Expression 12). Particularly, the fluctuation component of the distance between the representative trajectories that is represented by (Expression 13) represents a similarity in motion, and with this, it is possible to capture not only a rigid object of which the distance between the representative trajectories does not change but also a shape change of an articulated object and so on.

Next, the segmentation unit 1101 performs nonlinearization shown by (Expression 15) below, on the linear distance f(r, s) calculated according to (Expression 11).

$$f'(r,s) = \begin{cases} f(r,s) & \text{if } r \text{ is } K\text{-NearestNeighbor} \\ \infty & \text{otherwise} \end{cases} \qquad \text{(Expression 15)}$$

In other words, the segmentation unit 1101 selects K representative trajectories s in ascending order of the linear distance from the representative trajectory s when the representative trajectory r is a current representative trajectory, and does not change the distance from a selected representative trajectory s, and infinitely changes the distance from an unselected representative trajectory r. Here, K trajectories were selected in ascending order of the linear distance, but the threshold R may be set as shown in the following Expression 16. In other words, when the representative trajectory r is the current trajectory, the segmentation unit 1101 does not change the distance in the case where the linear distance from the representative trajectory s is below the threshold R, and changes the distance from the representative trajectory r into infinite an infinite value where the linear distance is equal to or above the threshold R.

$$f'(r,s) = \begin{cases} f(r,s) & \text{if } f(r,s) < R \\ \infty & \text{otherwise} \end{cases} \qquad \text{(Expression 16)}$$

Next, the segmentation unit 1101 calculates a geodetic distance g(r, s) by updating the distance as represented by (Expression 17) below, using the nonlinearized distance between representative trajectories f'(r, s).

$$g(r,s) = \min(f'(r,s), f'(r,k) + f'(k,s)) \qquad \text{(Expression 17)}$$

Note that min(x, y) is a function which returns a smaller one of the value x and the value y. In addition, k is a representative trajectory, and is a relay point to pass through in order to reach the representative trajectory s from the representative trajectory r. Here, the relay point s in f'(r, k)+f'(k, s) is not limited to one point. This method is a shortest path search method known as Dijkstra method and is described in the following Non Patent Reference 7.

[Non Patent Reference 7] E. W. Dijkstra, "A note on two problems in connexion with graphs", Numerische Mathematik, pp. 269-271, 1959

Figure 21:
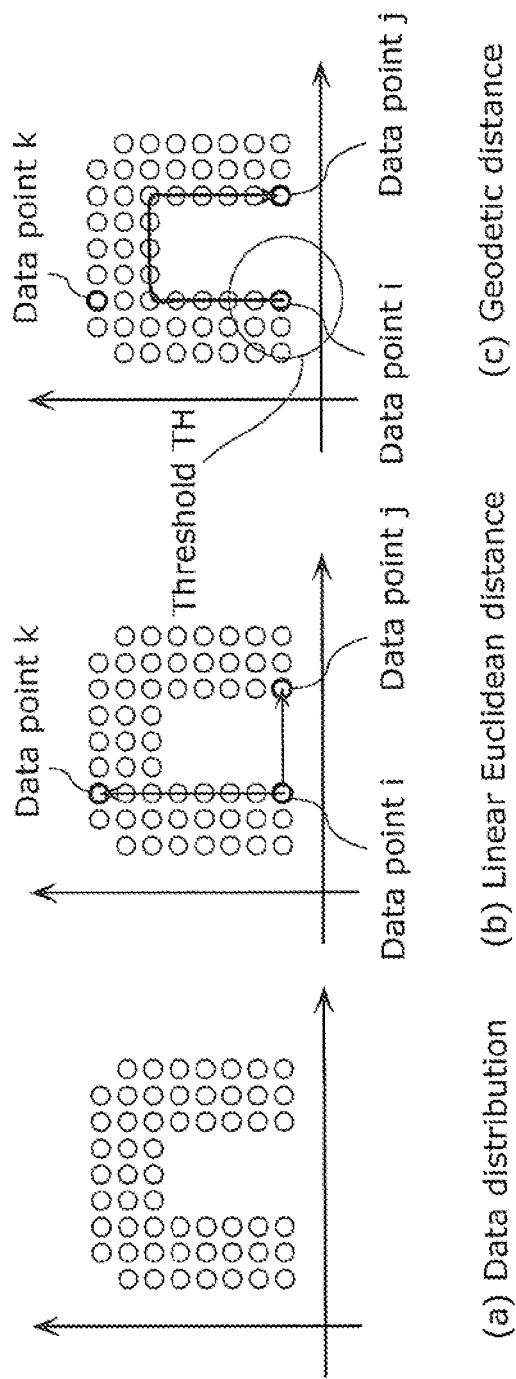
FIG. 21 is a diagram showing an example of processing performed by a segmentation unit according to the second embodiment of the present invention.

Here, nonlinearization as represented by (Expression 15) to (Expression 17) is described using conceptual diagrams in FIG. 21(*a*) to FIG. 21(*c*). Here nonlinearization using (Expression 16) is described, but the same advantageous effect can be expected with other nonlinearization processing. First, FIG. 21(*a*) shows two-dimensional data distribution. Here, each of the data points corresponds to the representative trajectory represented by (Expression 5). In the case of not performing nonlinearization according to (Expression 15) to (Expression 17), as shown in FIG. 21(*b*), a distance between a data point i and a data point j is smaller than a distance between the data point i and a data point k. However, as shown in FIG. 21(*c*), as a result of performing, for example, the processing in (Expression 16) and the processing in (Expression 17), the distance between the data point i and the data point j becomes not a Euclidean distance but what is called a geodetic distance which is a distance tracing the data points as indicated by an arrow. As a result, unlike the case of using the Euclidean distance, the distance between the data point i and the data point j becomes larger than the distance between the data point i and the data point k.

Figure 22:
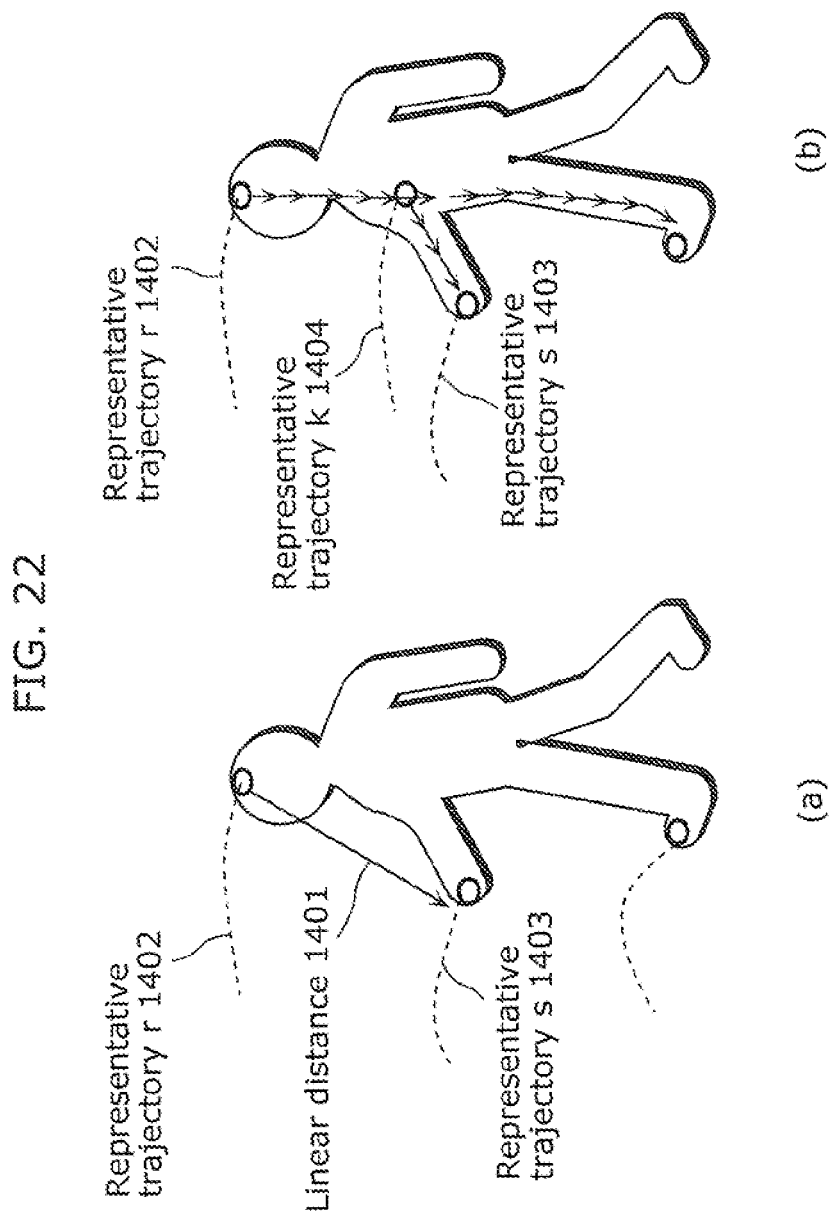
FIG. 22 is a diagram showing an advantage in the processing performed by the segmentation unit according to the second embodiment of the present invention.

Next, effectiveness of performing such nonlinearization as shown in (Expression 15) to (Expression 17) is described using conceptual diagrams in FIG. 22(*a*) and FIG. 22(*b*). Here, in order to clearly describe the difference between the linear distance f(r, s) and the distance $g_{new}$(r, s), the distance between representative trajectories is taken as an example, as represented by (Expression 14). In practice, it is possible to capture not only a shape but also a change in the shape of an articulated object and so on by using, in addition to the distance between the representative trajectories, a fluctuation component of the distance between the representative trajectories as motion similarity as represented by (Expression 11). FIG. 22(*a*) is an example of the case where the processing in (Expression 15) to (Expression 17) is not performed. For example, the distance between a representative trajectory r 1402 of a head region and a representative trajectory s 1403 of a hand region is a distance indicated by the linear distance 1401. On the other hand, as shown in FIG. 22(*b*), as a result of performing nonlinearization as expressed in (Expression 15) to (Expression 17), the distance between the representative trajectory r 1402 of the head region and the representative trajectory s 1403 of the hand region becomes a distance that is a linear summation shown by arrows, which leads to the representative trajectory s 1403 through a representative trajectory k 1404. Thus, whereas the linear distance 1401 cannot represent the shape of an object articulated with joints such as a person, the geodetic distance can represent the shape articulated with joints as a distance. Note that the method of calculating the geodetic distance is not limited to (Expression 17).

Figure 23:
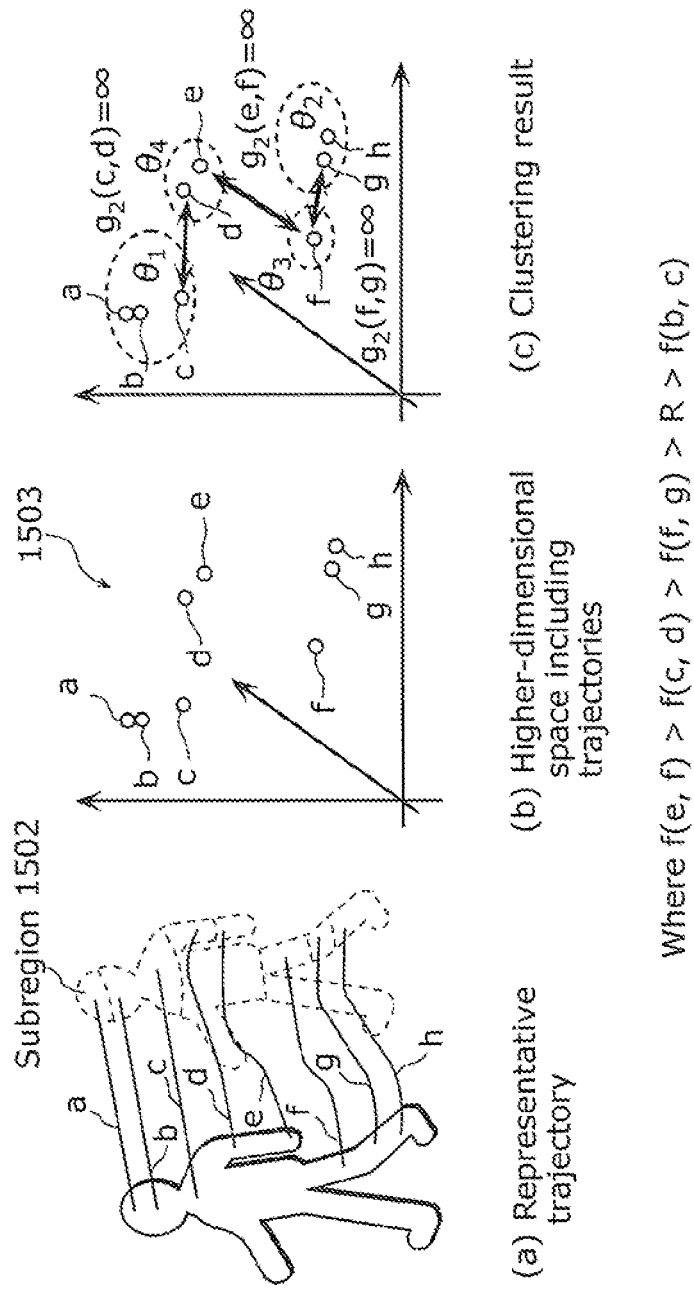
FIG. 23 is a diagram showing an example of a result of geodetic distance transformation performed by the segmentation unit according to the second embodiment of the present invention.

Next, clustering is performed by detecting the discontinuity point in the geodetic distance, using g(r, s) that has been transformed into the geodetic distance. Here, the discontinuity point in the geodetic distance falls between the representative trajectory r and the representative trajectory s, where g(r, s) is infinite. An example of a result of the geodetic distance transformation which is obtained with respect to the threshold R represented by (Expression 16) is described with reference to FIG. 23. Here, FIG. 23(*a*) is a diagram showing trajectories a to h estimated in Step S306. A subregion 1502 shown in FIG. 23(*a*) is a subregion that the representative trajectories belong to. FIG. 23(*b*) is a conceptual diagram of a higher-dimensional space including the trajectories a to h shown in FIG. 23(*a*). Here, the number of the representative trajectories is eight, but in practice, representative trajectories corresponding to each of the subregions may be used. Here, one point in a higher-dimensional space 1503 including the representative trajectories corresponds to each of the representative trajectories represented by (Expression 5). Furthermore, on the higher-dimensional space 1503, a point-to-point distance does not correspond to a Euclidean distance between vectors, but corresponds to the geodetic distance as represented by (Expression 17).

FIG. 23(*c*) is a diagram showing a result of the clustering. Here, in FIG. 23(*c*), f(e, f)>f(c, d)>f(f, g)>f(b, c) where the f(a, b) is the distance between a representative trajectory a and a representative trajectory b as represented by (Expression 11). Here, it is assumed that when the threshold is set as R, the distance f(f, g) has a larger value than the threshold R. In this case, even when calculating the geodetic distance according to (Expression 17), each of g(e, f), g(c, d), and g(f, g) becomes infinite. Accordingly, the segmentation unit 1101 determines that each point between the representative trajectories c and d, between the representative trajectories e and f, and the representative trajectories f and g is the discontinuity point in the geodetic distance. As a result, the geodetic distance between the representative trajectories a, b, and c does not have an infinite value because the representative trajectories a, b, and c can be tracked without passing through the discontinuity point in the geodetic distance of each other; in contrast, for example, from each of these representative trajectories a, b, and c to another representative trajectory, the trajectories a, b, and c pass through discontinuity point g(c, d) in the geodetic distance, so that the geodetic distance between each of the representative trajectories a, b, and c, and another representative trajectory has an infinite value. Thus, a pair of the representative trajectories i and j not having an infinite geodetic distance are classified into the same class, and those having an infinite geodetic distance are classified into different classes. Then, the trajectories can be separated into four classes $\theta_1, \theta_2, \theta_3,$ and $\theta_4$ in total by classifying pairs into those having infinite geodetic distances and those not having infinite geodetic distances. Here, the segmentation unit 1101 integrates, as one segment, the subregion that the representative trajectories classified into each class $\theta_i$ belong to. For example, the example of FIG. 23 shows that the subregions, to which the representative trajectories classified into class $\theta_1$ belong, correspond to two head subregions and one chest subregion, and it is possible to perform segmentation by spatiotemporally integrating these three subregions as one segment. The same holds for classes $\theta_2$ to $\theta_4$.

With the processing described above, the segmentation unit 1101 can determine that such representative trajectories belong to the same class, judging that the representative trajectories not having an infinite geodetic distance are continuous. In addition, the segmentation unit 1101 can classify the representative trajectories based on the discontinuity point in the geodetic distance by determining that the representative trajectories having an infinite geodetic distance are not continuous. As a result, by integrating the subregions that the representative trajectories classified into one class belong to, it is possible to perform segmentation.

An output unit 105*b* outputs a result of the segmentation to the monitor and so on.

Note that according to the present embodiment, by calculating the geodetic distance for the representative trajectories, it is also possible to perform segmentation even on an object changing shape. Thus, in the example shown in FIG. 23, a difference in motion between the head region and arms, and a difference in motion between upper and lower thighs are reflected, so that the head region, the arms, the upper thighs, and the lower thighs can be segmented as separate classes. Furthermore, according to the present method, it is possible to perform not only segmentation on one moving object so as to segment the moving object into body parts but also segmentation including a background in a scene where, as shown in FIG. 24(*a*), more than one person is present, and it is also possible to perform detailed segmentation on each moving object as shown in FIG. 24(*b*). For example, by setting a larger threshold R for the image, it is also possible to display the image on the monitor such that regions resulting from the segmentation can be distinguished from each other by assigning different colors to the regions on the image each of which corresponds to class $\theta_m$, and so on. As shown in FIG. 24(*a*), each moving object may be displayed in different colors, or as shown in FIG. 24(*b*), each region may be separately displayed. In other words, as shown by FIG. 24, the segmentation apparatus according to the present embodiment can detect moving objects by performing the segmentation described above (FIG. 24(*a*)), and can also detect regions included in one moving object, that is, can perform segmentation on one moving object (FIG. 24(*b*)).

As described above, similar representative trajectories are clustered by performing clustering based on the similarity between representative trajectories, so that segmentation is performed. Thus, as a result of classifying regions having a small distance and having a similar motion as one class and temporally tracking a region of the object moving in video, it is possible to perform segmentation on a spatiotemporal image including the moving object. In addition, clustering is performed based on the similarity in the geodetic distance of the trajectories. Thus, even when moving objects different in size are present in the image or when a portion of the moving object is hidden, it is possible to robustly perform segmentation on the regions in the object. Furthermore, the clustering based on the discontinuity point in the geodetic distance allows clustering that is not influenced by the class size. Thus, even when a large object and a small object are simultaneously present or when an object having large motion and an object having small motion are simultaneously present, it is possible to reliably perform segmentation.

As described above, according to the second embodiment, trajectories separate from each other at a distance smaller than the geodetic distance at the discontinuity point are classified into one class. Thus, as compared to the clustering using the Euclidean distance that is a linear distance, the clustering considering a spatiotemporal continuity in the similarity between trajectories is performed. Accordingly, whether each block in the picture belongs to the same object (or the same region) or belongs to another object (or region) is reliably discriminated. As a result, even in the case of detecting an articulated object such as a person composed of regions different in motion, segmentation is accurately performed, so that the moving object is reliably detected. In other words, it is possible to correctly perform segmentation on the moving object such as a person that moves changing shape, and to thereby detect the moving object in the image.

Variation of Second Embodiment

Next described is a variation of the example which has been described in the second embodiment and in which spatiotemporal segmentation is to be performed. A segmentation apparatus according to the present variation performs segmentation on an image while at the same time automatically determining the class number, by performing pairwise clustering including a neighboring representative trajectory when performing clustering using the estimated representative trajectories. The segmentation apparatus includes: the image acceptance unit 101, the motion analysis unit 102, the hierarchical subregion generating unit 103, the representative trajectory estimation unit 104, the segmentation unit 1101, and the output unit 105a.

Since the image acceptance unit 101, the motion analysis unit 102, the hierarchical subregion generating unit 103, the representative trajectory estimation unit 104, the segmentation unit 1101, and the output unit 105a are the same as those in the second embodiment, the description thereof is not repeated. The processing performed by the segmentation unit 1101 is different from the processing in the second embodiment 2. Thus, in the present variation, the description will focus on the processing performed by the segmentation unit 1101.

The segmentation unit 1101 determines whether or not to integrate subregions to be integrated, based on representative trajectories corresponding to the subregions to be integrated and the representative trajectory of at least one subregion adjacent to the subregions to be integrated. In more detail, the segmentation unit 1101 calculates a minimum spanning tree from a graph in which the representative trajectories are assumed as nodes and are connected using edges, and the distance between the trajectories connected by the edges is assumed as an edge weight, and performs segmentation based on the connection relationship represented in the minimum spanning tree. Preferably, the segmentation unit 1101 performs segmentation by determining whether or not to integrate a pair of representative trajectories having a relationship in which the representative trajectories are directly connected to each other using one edge, based on edge weights connecting the pair and at least one representative trajectory adjacent to the pair.

Figure 25:
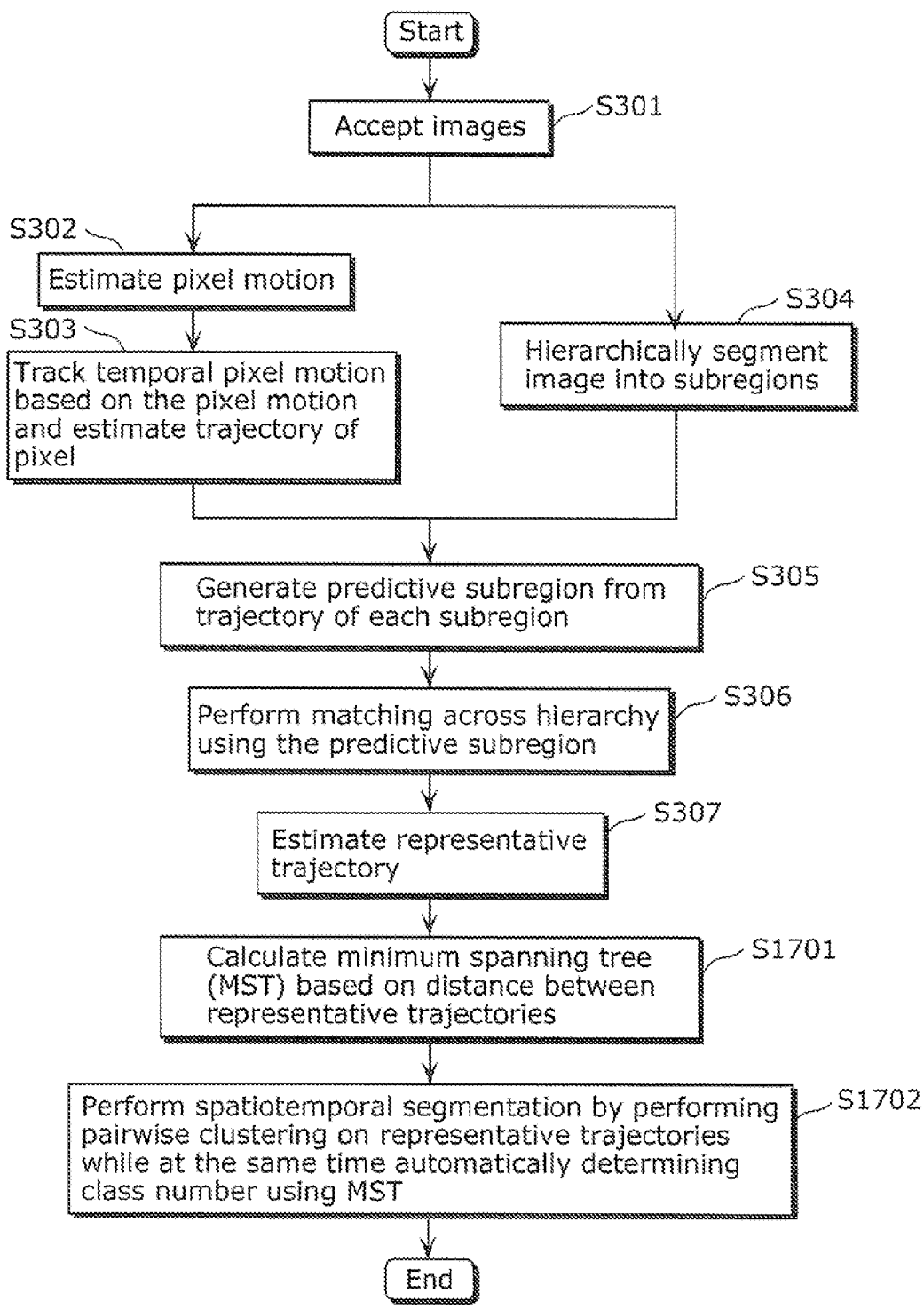
FIG. 25 is a flowchart showing a basic operation of the segmentation apparatus according to the second embodiment of the present invention.

Hereinafter, the operation of the segmentation apparatus according to the present variation is described using a flowchart in FIG. 25. Here described in detail is an example where segmentation is performed by performing, using the subregions estimated in the first embodiment and the trajectories corresponding to the subregions, pairwise clustering including a representative trajectory neighboring the representative trajectories.

It is possible to perform segmentation by clustering the representative trajectories using the K-means method, in which case the distance between the representative trajectories is limited to the Euclidean distance. Whereas, pairwise clustering such as a dendrogram has an advantage of being able to freely set the distance between two representative trajectories. For example, as represented by (Expression 11), it is also possible to include motion difference in the distance.

Since Steps S301 to S307 are the same as those in the first and the second embodiments, the description thereof is not repeated.

First, the segmentation unit 1101 calculates the distance between representative trajectories based on the representative trajectories calculated according to (Expression 5), (Expression 6), and (Expression 9), and generates a minimum spanning tree (hereinafter, referred to as "MST") that is information indicating a correlation between the representative trajectories based on the calculated distance between representative trajectories (Step S1701).

Hereinafter, the processing in S1701 is described in detail. Specifically, for calculating the distance between representative trajectories so as to perform pairwise clustering, it is possible to use the linear distance in (Expression 11) or the geodetic distance in (Expression 17) described in the second embodiment. The distance between representative trajectories may include not only a pixel position but also a component indicating motion similarity in the distance. Thus, it is possible to capture not only a rigid body of which the distance between representative trajectories does not change but also the shape change of an articulated object and so on.

Figure 26:
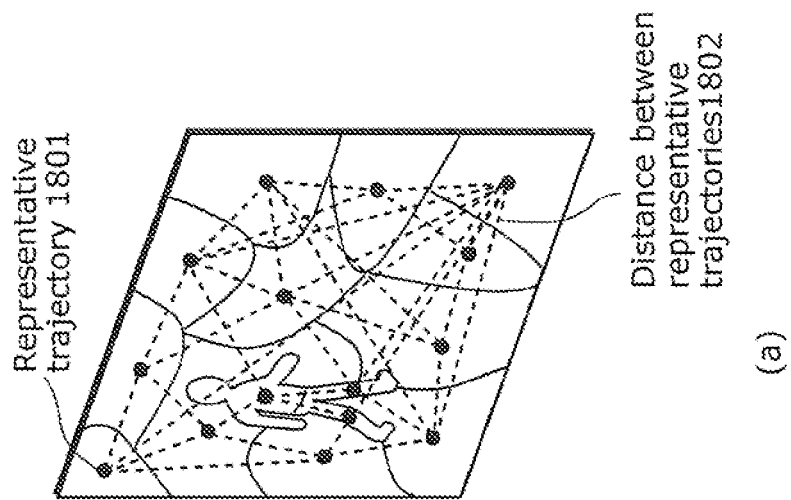
FIG. 26 is a diagram showing an example of a minimum spanning tree (MST) generated by the segmentation unit according to a variation of the second embodiment of the present invention.

Next, the segmentation unit 1101 generates a MST based on the correlation between the representative trajectories as a connection relationship, using the calculated distance between representative trajectories. FIG. 26(a) shows, as a graph, the connection relationships between representative trajectories, which are represented by (Expression 11) before generating the MST. In the graph, each representative trajectory 1801 is shown as a node, and the relationships between each representative trajectory 1801 and all the other distances between trajectories 1802 are represented as edges as shown by the dashed lines. Note that each of the edges (dashed lines) holds a distance between representative trajectories, and all the representative trajectories are connected by edges having a weight as a distance. On the other hand, since edges are generated such that the summation of the distances between representative trajectories is the smallest, the MST can be structured with limited distances between representative trajectories as shown in FIG. 26(b). In FIG. 26(b), the representative trajectories having no connection relationship are equivalent to those having the representative trajectories represented as infinite. Thus, expressing the representative trajectories within such a limited connection relationship produces an advantageous effect of being able to reduce an amount of memory or further reducing an amount of calculation when performing clustering. With the MST, it is possible to use the method described in Non Patent Reference 8. Therefore, the detailed description thereof is not repeated here.

[Non Patent Reference 8] Thomas H. Cormen, Charles E. Leiserson, Ronald L. Riverst and Clifford Stein, "Introduction to Algorithms", MIT Press, pp. 561-579

Next, the segmentation unit 1101 performs clustering on the representative trajectories by selecting a pair of representative trajectories having a relationship in which the representative trajectories are directly connected to each other using one edge, from the MST including such limited distances between representative trajectories as shown in FIG. 26(b), and by performing processing for determining whether or not the representative trajectories making up the pair belong to the same class. Thus, again, with reference to FIG. 25, the segmentation unit 1101 performs segmentation by assuming, as the same segment, the subregions that the representative trajectories classified as the same class belong to (Step S1702).

Hereinafter, the details of Step S1702 is described.

Figure 27:
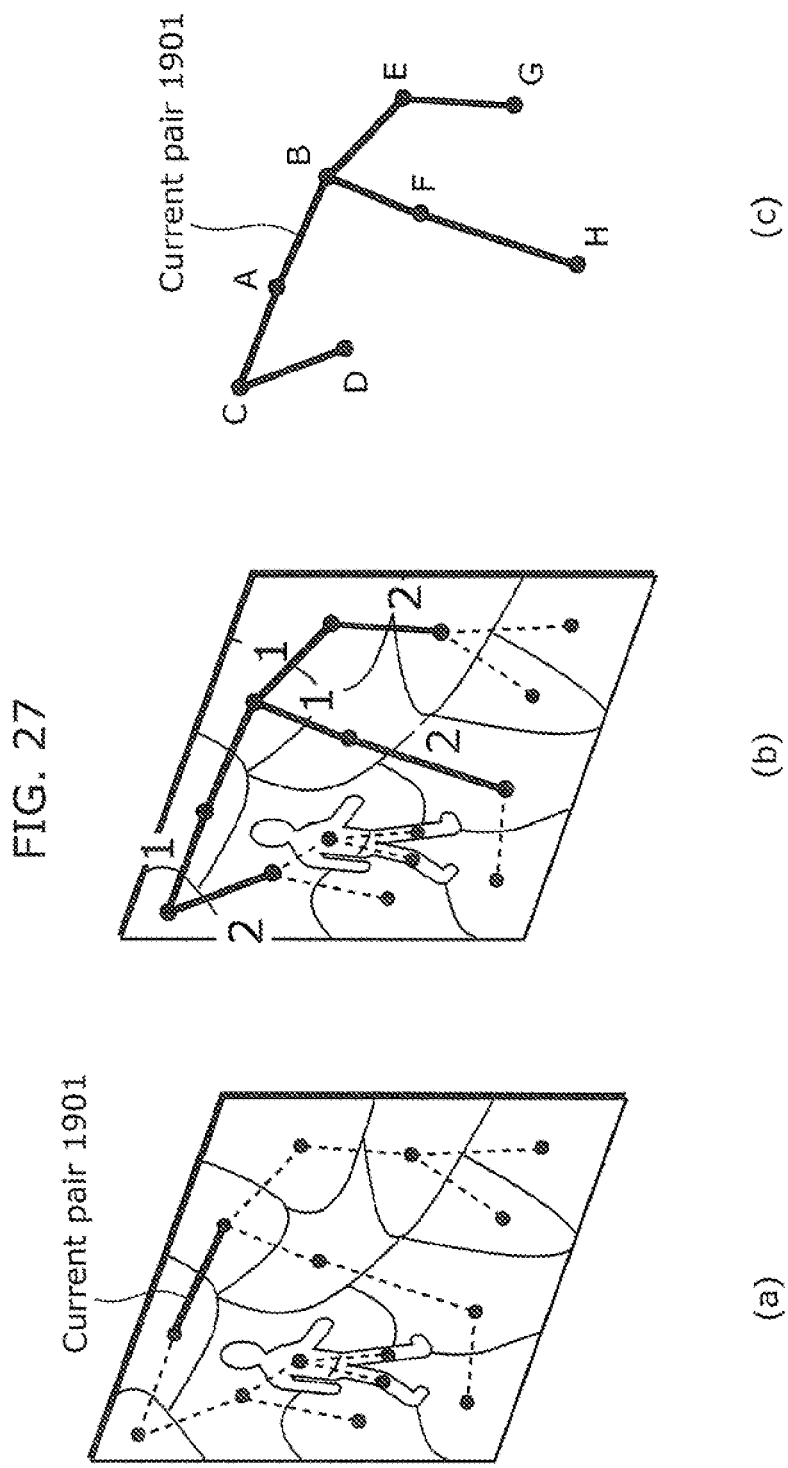
FIG. 27 is a diagram showing an example of a current pair generated by the segmentation unit according to the variation of the second embodiment of the present invention.

First, the segmentation unit 1101 selects, from the MST, a pair of representative trajectories having a relationship of direct connection. For example, a current pair 1091 is selected as shown in FIG. 27(a). Note that here, an example is described although in practice it is sufficient to select all the representative trajectories having the relationship of direct connection and perform the following processing on each of them.

Next, the segmentation unit 1101 selects, in accordance with the connection relationship represented by the MST, a representative trajectory (node) that can be reached from the current pair through up to N paths. This determines a neighborhood relationship that should be considered when performing clustering. FIG. 27(b) shows the neighborhood relationship where N=2. The portion shown by solid lines is the representative trajectory that is to be considered when performing clustering. A number such as "1" and "2" shown in the figure corresponds to the number of paths from the selected node that is the current pair. Here, N may be previously determined, or the number of the representative trajectories to be considered may be previously determined. As compared to pairwise clustering such as a dendrogram in which clustering is performed considering only the closest two points in the neighborhood, it is possible to perform clustering considering not only the closest neighborhood but also information on the periphery by taking the representative trajectories on the periphery into consideration. Thus, this produces an advantageous effect of being able to better reflect the structure of the image, and to perform segmentation that is less susceptible to influences such as difference in size of the object in the image.

Next, the segmentation unit 1101 performs clustering using the current pair and the representative trajectory in the neighborhood.

Here, in the pairwise clustering such as a dendrogram, it is determined whether or not to perform integration into a class based only on information regarding the current pairs. Thus, with an articulated object such as a person, it is not possible to consider the relationship between spatially distant regions such as a hand and a foot. Whereas, by performing pairwise clustering including the neighborhood, it is possible to consider a relationship between regions including a relationship between the hand and the foot. Thus, there is an advantage of being able to accurately perform segmentation even on an articulated object such as a person. As another advantageous effect, since a relationship with a spatially distant place is also taken into consideration, it is possible to perform clustering less susceptible to influences such as change or difference in size of the object in the image.

Figure 28:
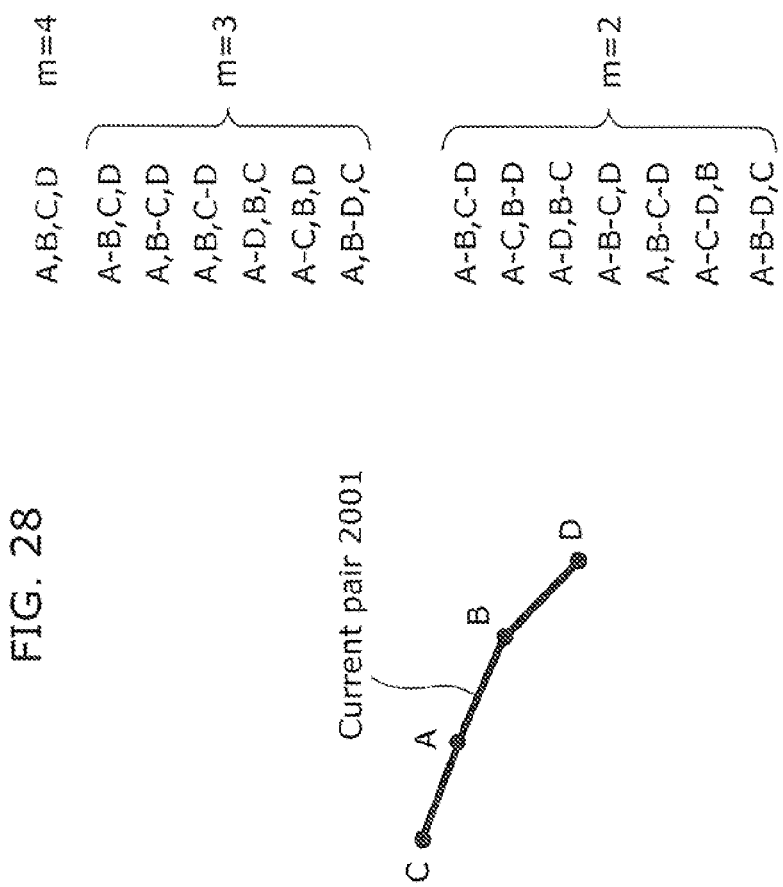
FIG. 28 is a diagram showing an example of processing for automatically determining a class number performed by the segmentation unit according to the variation of the second embodiment of the present invention.

Here, it is possible to automatically determine the final class number by applying, to all the current pairs, the processing for determining whether or not the current pairs belong to the same class. Note that clustering can be performed in two stages, that is, preclustering and integration. First, preclustering is described using a specific example. Here, in order to describe clearly, as shown in FIG. 28(a) instead of FIG. 27(c), it is assumed that A and B are nodes of the current pair (representative trajectories) and C and D are neighboring nodes (representative trajectories) other than the pair. Note that this does not limit the number of nodes to be used for the preclustering.

First, in the preclustering, a pre-class number of the representative trajectories A to D is determined within a framework of model selection, and preclustering is performed on the representative trajectories A to D, based on the pre-class number. Specifically, preclustering can be represented by the following (Expression 18).

$$P(y|m) = \int P(y|\theta_m, m) P(\theta_m|m) d\theta_m \quad \text{(Expression 18)}$$

Here, m represents the pre-class number. As shown in FIG. 28(b), when performing preclustering on the representative trajectories from A to D, four types of pre-class numbers 1 (All of A to D are in the same class) to 4 (All of A to D are in different classes). Thus, in this case, m assumes four types of values from 1 to 4.

Then, $$P(y|\theta_m, m)$$

represents likelihood in each preclustering where the pre-class number is m. Here, for example, where the pre-class number m=2, the segmentation unit 1101 considers the following seven preclusterings as conceivable candidates for classifying the representative trajectories A to D into two pre-classes. In practice, as shown in FIG. 28(b), the segmentation unit 1101 calculates all the conceivable preclustering candidates when determining the pre-class number m as: m=1 to 4.

$$(\vartheta_m, m=2) = \begin{cases} (A-B-C, D) \\ (A-B, C-D) \\ (A-C, B-D) \\ (A-D, B-C) \\ (A-C-D, B) \\ (A-B-D, C) \\ (A, B-C-D) \end{cases} \quad \text{(Expression 19)}$$

Here, "-" in "A-B-C" and so on indicates the same pre-class relationship, and "," represents belonging to a different pre-class. For example, in the case of a preclustering candidate (A-B-C, D), the representative trajectories A, B, and C belong to the same class, and only D belongs to a different class. In the case, $$P(y|\theta_m, m)$$

is represented by (Expression 20) as below.

$$P(y|\theta_m, m) = P_{AB} \cdot P_{BC} \cdot P_{AC} \cdot (1-P_{AD}) \cdot (1-P_{BD}) \cdot (1-P_{CD}) \quad \text{(Expression 20)}$$

where m=2.

Thus, the segmentation unit 1101 calculates likelihood in the preclustering, using P in the case of the same pre-class, and using (1−P) in the case of the different class. Likewise, where m=2, the segmentation unit 1101 calculates likelihood as represented by (Expression 20) for all the preclustering candidates represented by (Expression 19). In addition, in the case of m=1, 3, and 4, the segmentation unit 1101 calculates likelihood in preclustering as represented by (Expression 20) for all the preclustering candidates shown in FIG. 28(b).

Then, $$P(\theta_m|m)$$

can be represented as below according to the number of preclustering candidates $z_m$ in the case of the pre-class number m. For example, in the representative trajectories A to D, $z_m=7$ where m=2.

$$P(\theta_m|m)=1/z_m \quad \text{(Expression 21)}$$

Then, $P_{RS}$ in (Expression 20) can be calculated as below from normal distribution and the distance f between representative trajectories in (Expression 11).

$$P_{RS} = \frac{1}{\sqrt{2\pi}\,\sigma}\exp\left(-\frac{(f(R,S))^2}{2\sigma^2}\right) \quad \text{(Expression 22)}$$

It goes without saying that the geodetic distance g represented in (Expression 17) may be used in place of the distance f between representative trajectories. As described above, it is possible to perform integral calculation according to (Expression 18), using information in (Expression 18) to (Expression 22).

Then, the segmentation unit 1101 selects a preclustering candidate from among the preclustering candidates represented by (Expression 19), using the largest pre-class number in P(y|m) which is calculated for each pre-class number m such that $$P(y|\theta_m,m)$$

becomes maximum. Here, as shown in FIG. 28(b), a preclustering candidate may be selected from among all the preclustering candidates such that $$P(y|\theta_m,m)$$

becomes maximum, or as described earlier, the pre-class number m with which P(y|m) becomes maximum may be calculated so as to select, under the condition of the pre-class number m, the preclustering candidate such that $$P(y|\theta_m,m)$$

becomes maximum.

In clustering, generally, there is a problem of loss of generalizing performance caused by what is called overfitting which is excessive fitting to the data as a result of increasing data expression capacity by increasing the class number. By using the method described above, it is possible to automatically determine the pre-class number m without increasing the pre-class number excessively, thus producing an advantageous effect of achieving high generalization.

Next, the integration is described. Here, when a current pair 2001 is determined as belonging to the same pre-class, the representative trajectory A and representative trajectory B that are the current pair are integrated.

As a specific example, it is assumed that, where m=2, P(y|m) is calculated to be maximum according to (Expression 18). Next, it is assumed that: under condition of m=2 and when (A-B-C, D) is the preclustering candidate, $$P(y|\theta_m,m)$$

is calculated to be maximum according to (Expression 20). In this case, since the current pair A and B belongs to the same pre-class, trajectories A and B are determined as belonging to the same class and are thus integrated. For example, it is likewise assumed that: under condition of m=2 and when (A, B-C-D) is the preclustering candidate, $$P(y|\theta_m,m)$$

is calculated to be maximum according to (Expression 20). In this case, since representative trajectories A and B belonging to the current pair 2001 belong to different pre-classes, the representative trajectories A and B are not integrated.

As described above, the segmentation unit 1101 determines whether or not to integrate the representative trajectories belonging to the current pair 2001. The segmentation unit 1101 integrates representative trajectories by performing such determination on all the pairs directly connected to each other by the MST. With this, it is possible to ultimately obtain an output as shown in FIG. 28(c). FIG. 28(c) shows obtained results of the determination that a current pair connecting a person and a background is determined as belonging to different pre-classes, and that each of a current pair in the person and a current pair in the background belongs to the same pre-class. Then, by integrating the representative trajectories determined as belonging to the same pre-class and the subregion that the representative trajectories belong to, it is possible to perform spatiotemporal segmentation as in the second embodiment.

Furthermore, weighting may be performed on the distance f between representative trajectories in (Expression 22), based on the inclusion relationship of the subregions generated by the hierarchical subregion generating unit. More specifically, in the case where certain two subregions generated by the hierarchical subregion generating unit are included in the same subregion (belong to the same subregion) at a higher hierarchical level, it is possible to obtain a relatively small distance by multiplying the distance f between the representative trajectories of the two subregions by a coefficient smaller than 1. On the other hand, in the case where certain two subregions are not included in the same subregion (belong to different subregions) at a higher hierarchical level, it is possible to obtain a relatively large distance by multiplying the distance f between the representative trajectories of the two subregions by a coefficient equal to or larger than 1. As a result, even in the case of the representative trajectory including an error, it is possible to perform more robust segmentation by reflecting a spatial structure based on image contour.

Note that using the method in the present variation produces an advantageous effect of being able to perform segmentation without necessitating a previous setting of the class number nor without restricting the scene to which the method is applicable. In addition, since the preclustering considering not only the closest neighborhood but also the representative trajectory on the periphery, it is also possible to perform clustering which is not influenced by the largeness in class size. Thus, even when a large object and a small object are simultaneously present or when an object having large motion and an object having small motion are simultaneously present, it is possible to reliably perform segmentation. As described above, it is possible to perform segmentation with high accuracy.

Thus far, the trajectory estimation method and the trajectory estimation apparatus, and the segmentation method according to an implementation of the present invention have been described based on the embodiments and the variation thereof, but the present invention is not limited to these embodiments and variations. Those skilled in the art will readily appreciate that many modifications are possible in the exemplary embodiments without departing from the novel teachings and advantages of this invention. Accordingly, all such modifications are intended to be included within the scope of this invention.

In addition, the present invention also includes an embodiment realized by an arbitrary combination of characteristic constituent elements in each embodiment.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is particularly applicable to an image processing apparatus which estimates a trajectory of an object such as a person that moves changing shape and which performs spatiotemporal segmentation. Particularly, the present invention is applicable as an image processing device and so on that can be incorporated in a motion analysis apparatus, a monitoring apparatus, or a video camera, or audio-video equipment such as a TV apparatus.

What is claimed is:

1. A trajectory estimation method for estimating a trajectory of a subregion constituting all or part of a moving object in a video, said trajectory estimation method comprising:
accepting images included in the video, the images being temporally sequential;
generating subregions at hierarchical levels by performing hierarchical segmentation on each of the images accepted in said accepting such that a spatially larger subregion includes spatially smaller subregions, the spatially larger subregion and the spatially smaller subregions belonging to hierarchical levels different from each other; and
estimating, as a representative trajectory, a trajectory, in the video, of a subregion included in a certain image, by (i) searching for a subregion that is most similar to the subregion included in the certain image, across hierarchical levels in another image different from the certain image, and (ii) generating data by chronologically arranging positions of the searched subregion in each of the images,
wherein in said estimating, (i) a predictive subregion, which is a subregion predicted in the other image and is a template for searching, is generated by estimating, as the template, a set of corresponding points which are destinations of trajectories belonging to the subregion included in the certain image, and (ii) the representative trajectory is obtained by searching for the subregion that is the most similar to the predictive subregion, across the hierarchical levels in the other image, and generating data by chronologically arranging positions of the searched subregion in each of the images.

2. The trajectory estimation method according to claim 1, further comprising
generating, in the video, a trajectory of a block by analyzing motion between the images for each block made up of one or more pixels included in each of the images,
wherein in said estimating, the predictive subregion is generated by moving the subregion included in the certain image in accordance with the trajectory of a block included in the subregion.

3. The trajectory estimation method according to claim 2, wherein in said estimating, the trajectory included in each of the subregions generated in said generating is smoothed for the each of the subregions, and the representative trajectory is estimated based on the smoothed trajectory included in the each of the subregions.

4. The trajectory estimation method according to claim 1, wherein in said estimating, the subregion is searched by determining a similarity between subregions, using a similarity measure including at least one of shape information and a pixel value for the subregion.

5. The trajectory estimation method according to claim 1, wherein in said estimating, the representative trajectory is estimated by (i) assuming a graph in which: the subregion included in the certain image and the subregion included in the other image are nodes; one of the nodes that indicates the subregion included in the certain image and another one of the nodes that indicates the subregion included in the other image are connected using an edge; and a value that is smaller for a larger similarity between the subregions connected by the edge is an edge weight, and (ii) generating an optimal path for the graph by applying dynamic programming to the graph.

6. The trajectory estimation method according to claim 1, wherein in said generating, the subregions are generated at the hierarchical levels, based on a feature including contour information.

7. A segmentation method for performing segmentation on video per moving object, said segmentation method comprising:
processing the video using said trajectory estimation method according to claim 1; and
performing segmentation on the video by integrating subregions having similar representative trajectories.

8. The segmentation method according to claim 7, wherein in said performing, the segmentation is performed by transforming a distance between the representative trajectories into a geodetic distance by connecting distances smaller than a threshold, detecting a discontinuity point in the obtained geodetic distance, and classifying, into one class, trajectories separate from each other at a distance smaller than the geodetic distance at the detected discontinuity point.

9. The segmentation method according to claim 7, wherein in said performing, based on representative trajectories corresponding to subregions to be integrated and the representative trajectory of at least one subregion adjacent to the subregions to be integrated, it is determined whether or not to integrate the subregions to be integrated.

10. The segmentation method according to claim 9, wherein in said performing, the segmentation is performed based on a connection relationship indicated in a minimum spanning tree which is calculated according to a graph in which: the representative trajectories are assumed as nodes and are connected with each other using an edge; and the distance between representative trajectories connected by the edge is assumed as an edge weight.

11. The segmentation method according to claim 10, wherein in said performing, the segmentation is performed by determining, in the minimum spanning tree, whether or not to integrate a pair of representative trajectories having a relationship in which the representative trajectories are directly connected to each other using one edge, based on edge weights connecting the pair with at least one representative trajectory adjacent to the pair.

12. A trajectory estimation apparatus for estimating a trajectory of a subregion constituting all or part of a moving object in a video, said trajectory estimation apparatus comprising:
an image acceptance unit configured to accept images included in the video, the images being temporally sequential;

a hierarchical subregion generating unit configured to generate subregions at hierarchical levels by performing hierarchical segmentation on each of the images accepted by said image acceptance unit such that a spatially larger subregion includes spatially smaller subregions, the spatially larger subregion and the spatially smaller subregions belonging to hierarchical levels different from each other; and a representative trajectory estimation unit configured to estimate, as a representative trajectory, a trajectory, in the video, of a subregion included in a certain image, by (i) searching for a subregion that is most similar to the subregion included in the certain image, across hierarchical levels in another image different from the certain image, and (ii) generating data by chronologically arranging positions of the searched subregion in each of the images, wherein said representative trajectory estimating unit (i) generates a predictive subregion, which is a subregion predicted in the other image and is a template for searching, by estimating, as the template, a set of corresponding points which are destinations of trajectories belonging to the subregion included in the certain image, and (ii) obtains the representative trajectory by searching for the subregion that is the most similar to the predictive subregion, across the hierarchical levels in the other image, and generating data by chronologically arranging positions of the searched subregion in each of the images.

13. A non-transitory computer-readable recording medium on which a program for estimating a trajectory of a subregion constituting all or part of a moving object in a video is recorded, the program causing a computer to execute:

accepting images included in the video, the images being temporally sequential;

generating subregions at hierarchical levels by performing hierarchical segmentation on each of the images accepted in the accepting such that a spatially larger subregion includes spatially smaller subregions, the spatially larger subregion and the spatially smaller subregions belonging to hierarchical levels different from each other; and estimating, as a representative trajectory, a trajectory, in the video, of a subregion included in a certain image, by (i) searching for a subregion that is most similar to the subregion included in the certain image, across hierarchical levels in another image different from the certain image, and (ii) generating data by chronologically arranging positions of the searched subregion in each of the images, wherein in the estimating, (i) a predictive subregion, which is a subregion predicted in the other image and is a template for searching, is generated by estimating, as the template, a set of corresponding points which are destinations of trajectories belonging to the subregion included in the certain image, and (ii) the representative trajectory is obtained by searching for the subregion that is the most similar to the predictive subregion, across the hierarchical levels in the other image, and generating data by chronologically arranging positions of the searched subregion in each of the images.

* * * * *